(12) United States Patent
Kubota et al.

(10) Patent No.: US 8,828,579 B2
(45) Date of Patent: Sep. 9, 2014

(54) BATTERY

(75) Inventors: Tadahiko Kubota, Kanagawa (JP);
Momoe Adachi, Tokyo (JP); Shigeru Fujita, Tokyo (JP)

(73) Assignee: Sony Corporation, Tokyo (JP)

( * ) Notice: Subject to any disclaimer, the term of this patent is extended or adjusted under 35 U.S.C. 154(b) by 1474 days.

(21) Appl. No.: 10/813,529

(22) Filed: Mar. 30, 2004

(65) Prior Publication Data

US 2004/0197650 A1   Oct. 7, 2004

(30) Foreign Application Priority Data

| Apr. 1, 2003 | (JP) | ............................ P2003-098454 |
| Aug. 1, 2003 | (JP) | ............................ P2003-285009 |
| Feb. 3, 2004 | (JP) | ............................ P2004-026572 |

(51) Int. Cl.
   *H01M 10/40* (2006.01)

(52) U.S. Cl.
   USPC ...... 429/122; 429/134; 429/199; 429/231.95; 429/300; 429/303; 429/307; 429/316

(58) Field of Classification Search
   None
   See application file for complete search history.

(56) References Cited

U.S. PATENT DOCUMENTS

| 6,015,979 | A | 1/2000 | Sugiura et al. |
| 2001/0038655 | A1 | 11/2001 | Tanaka et al. |
| 2002/0028389 | A1* | 3/2002 | Sonoda et al. ................. 429/324 |
| 2003/0027050 | A1* | 2/2003 | Okamoto et al. ........ 429/231.95 |
| 2003/0044680 | A1* | 3/2003 | Umemoto ..................... 429/213 |
| 2004/0096733 | A1* | 5/2004 | Shibamoto et al. ............. 429/94 |
| 2004/0241551 | A1* | 12/2004 | Nakamura et al. ............ 429/303 |

FOREIGN PATENT DOCUMENTS

| EP | 1 005 068 A2 | 5/2000 |
| EP | 1 088 914 A1 | 4/2001 |
| EP | 1 162 204 | 12/2001 |
| EP | 1 174 941 | 1/2002 |
| EP | 1 205 480 | 5/2002 |
| JP | 11-103135 | 4/1999 |
| JP | 11-195813 | 7/1999 |
| JP | 11-238687 | 8/1999 |
| JP | 2000-21789 | 1/2000 |
| JP | 2000-164929 | 6/2000 |
| JP | 2000-353669 | 12/2000 |

(Continued)

OTHER PUBLICATIONS

Kanamura, K. et al., "Electrochemical Behavior of AI Current Collector of Rechargeable Lithium Batteries in Propylene Carbonate with LiCF3SO3, Li(CF3SO2)2N, or Li(C4F9SO2)(CF3SO2)N." Journal of The Electrochemical Society, 149 (2) A185-A194 (2002).*

(Continued)

*Primary Examiner* — Alix Echelmeyer
(74) *Attorney, Agent, or Firm* — Dentons US LLP

(57) ABSTRACT

The invention provides a battery, which can improve battery characteristics such as high temperature storage characteristics. The battery comprises a battery device, wherein a cathode and an anode are wound with a separator in between. The anode contains an anode material capable of inserting and extracting Li as an anode active material. An electrolytic solution is impregnated in the separator. The electrolytic solution contains a solvent, and an electrolyte salt such as Li[B(CF$_3$)$_4$] dissolved in the solvent, which is expressed by a chemical formula of Li[B(RF1)(RF2)(RF3)RF4]RF 1, RF 2, RF 3, and RF 4 represent a perfluoro alkyl group whose number of fluorine or carbon is from 1 to 12, respectively. Consequently, high temperature storage characteristics are improved.

7 Claims, 6 Drawing Sheets

(56) References Cited

FOREIGN PATENT DOCUMENTS

| | | |
|---|---|---|
| JP | 2001-257193 | 9/2001 |
| JP | 2002-33512 | 1/2002 |
| JP | 2002-063934 | 2/2002 |
| JP | 2002-298912 | 10/2002 |
| JP | 2003-007333 | 1/2003 |
| JP | 2003-007336 | 1/2003 |
| JP | 2003-78214 | 3/2003 |
| WO | WO/02/78113 * | 3/2002 |
| WO | WO02/33765 * | 4/2002 |
| WO | WO 03/028144 * | 4/2003 |

OTHER PUBLICATIONS

European Search Report dated Jan. 17, 2007.

* cited by examiner

BATTERY

BACKGROUND OF THE INVENTION

1. Field of the Invention

The present invention relates to a battery comprising a cathode, an anode, and an electrolyte.

2. Description of the Related Art

In recent years, many portable electronic devices such as a combination camera (video tape recorder), a mobile phone and a laptop computer have been introduced. Downsizing and weight saving of these devices have been made. Along with these situations, active research and development has been promoted in order to improve an energy density of a battery, particularly a lithium ion secondary battery as a portable power source for these electronic devices.

As a secondary battery coverable of obtaining a high energy density, for example, there is a lithium ion secondary battery, wherein a material such as carbon materials capable of inserting and extracting lithium (Li) is used for an anode. The lithium ion secondary battery is designed so that lithium inserted in the anode material is always in a state of ion. Therefore, its energy density largely depends on the number of lithium ions which can be inserted in the anode material. Consequently, it is thought that the energy density of the lithium ion secondary battery can be further improved by improving an inserting volume of the lithium ions. However, using graphite, which is currently considered as a material capable of inserting and extracting lithium ions most effectively, the theoretical limit of the inserting volume is 372 mAh as a quantity of electricity per 1 g. Lately, the limit is almost attained.

As a secondary battery coverable of obtaining a high energy density, for example, there is also a lithium metal secondary battery, wherein a lithium metal is used for an anode, and precipitation and dissolution reaction of the lithium metal is utilized for anode reaction. The lithium metal has a high theoretical electrochemical equivalent, 2,054 mAh/cm$^3$, and has an energy density equivalent to 2.5 times the graphite used for the lithium ion secondary battery. Therefore, the lithium metal secondary battery has a potential ability to realize a high energy density beyond that of the lithium ion secondary battery.

So far, many researchers have conducted research and development on practical use of the lithium metal secondary battery (for example, refer to Edited by Jean-Paul Gabano, "Lithium Batteries," Academic Press, London, New York (1983)). However, in the lithium metal secondary battery, its discharge capacity significantly deteriorates after charge and discharge is repeated. Therefore, its practical use is currently very difficult. This capacity deterioration is based on that the lithium metal secondary battery utilizes precipitation and dissolution reaction of lithium metal in the anode. The reason of this capacity deterioration is thought that the deposited lithium metal falls away from the anode, or deactivated by reaction with an electrolyte, in accordance with charge and discharge.

Therefore, applicants of the invention have developed a new secondary battery, wherein an anode capacity includes a capacity component by insertion and extraction of the lithium and a capacity component by precipitation and dissolution of the lithium metal, and the anode capacity is expressed by the sum of the foregoing two capacity components (for example, refer to International Publication No. WO01/22519). In this secondary battery, a carbon material capable of inserting and extracting lithium ions is used for the anode, and the lithium metal is precipitated on the surface of the carbon material during the charge. According to this secondary battery, it is expected that charge and discharge cycle characteristics can be improved while attaining a high energy density.

Conventionally, as an electrolyte for the battery wherein such lithium is used as a battery reacting species, one wherein LiPF$_6$ as an electrolyte salt is dissolved in a carbonic acid ester nonaqueous solvent such as propylene carbonate and diethyl carbonate has been widely used in view of its high conductivity and stable potential.

However, thermal stability of LiPF$_6$ is not satisfactory. Therefore, there has been a problem that when LiPF$_6$ is used for the battery, high temperature storage characteristics or the like are lowered. Such characteristics deterioration arises even when thermal decomposition of LiPF$_6$ occurs slightly in the electrolyte.

As electrolyte salts other than LiPF$_6$, LiBF$_4$, LiCF$_3$SO$_3$, LiClO$_4$, and LiAsF$_6$ are known as well. However, these electrolyte salts have respective problems. That is, LiBF$_4$ has high thermal stability and oxidation stability, but low conductivity, and LiCF$_3$SO$_3$ has a high thermal stability but low conductivity and oxidation stability, leading to a problem that sufficient discharge characteristics cannot be obtained when charged at a high voltage of 4 V or more. Meanwhile, Li O$_4$ and LiAsF$_6$ have high conductivity, but have a problem that excellent charge and discharge characteristics cannot be obtained. Further, an electrolyte wherein LiClO$_4$ or LiAsF$_6$ is used always has a minor potential. Therefore, there has been a problem that when precipitating a highly reactive lithium metal, these electrolytes react to the lithium metal, leading to deterioration of the capacity. Consequently, in order to resolve the foregoing problems, it has been considered to use a new electrolyte salt.

Meanwhile, an electrolyte salt, which is expressed by a chemical formula of $M^{n+}([BR1_4]^-)_n$ (in this chemical formula, $M^{n+}$ represents cation, n represents a valence. R1 represents $C_xF_{2x+1}$ (1≤X≤8)) has been newly synthesized. It has been considered to apply this new electrolyte salt to secondary batteries and capacitors (for example, refer to Japanese Unexamined Patent Application Publication No. 2002-25610, and Japanese Unexamined Patent Application Publication No. 2002-308884).

However, no reports have been received that this new electrolyte salt is used for the battery wherein lithium is used as a battery reaction species as mentioned above. Therefore, practicality of the new electrolyte salt has been unknown.

SUMMARY OF THE INVENTION

The invention has been achieved in consideration of such problems, and it is an object of the invention to provide a battery which can improve battery characteristics such as high temperature characteristics.

A first battery of the invention comprises a cathode; an anode; and an electrolyte, wherein the electrolyte contains anions expressed by Chemical formula 1.

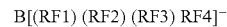  [chemical formula 1]

B[(RF1) (RF2) (RF3) RF4]$^-$

In Chemical formula 1, RF1, RF2, RF3, and RF4 represent a perfluoro alkyl group whose number of fluorine or carbon is from 1 to 12, respectively.

A second battery of the invention comprises a cathode; an anode; and an electrolyte, wherein an anode capacity includes a capacity component by insertion and extraction of a light metal and a capacity component by precipitation and dissolution of a light metal, the anode capacity is expressed by the sum of these capacity components, and the electrolyte contains anions expressed by Chemical formula 1.

A third battery of the invention comprises a cathode; an anode; and an electrolyte, wherein the electrolyte contains a high molecular weight compound and anions expressed by Chemical formula 1.

According to the first to third batteries of the invention, the electrolyte contains the forgoing anions. Therefore, battery characteristics such as high temperature storage characteristics can be improved.

In particular when other anions are further contained in addition to the foregoing anions, for example, inner resistance can be reduced, and battery characteristics can be further improved.

Further, when a moisture content in the electrolyte is 100 ppm or less at a mass ratio in relation to the electrolyte, high temperature storage characteristics can be further improved.

Other and further objects, features and advantages of the invention will appear more fully from the following description.

DETAILED DESCRIPTION OF THE PREFERRED EMBODIMENTS

Embodiments of the invention will be described in detail hereinbelow with reference to the drawings.

[First Embodiment]

Figure 1:
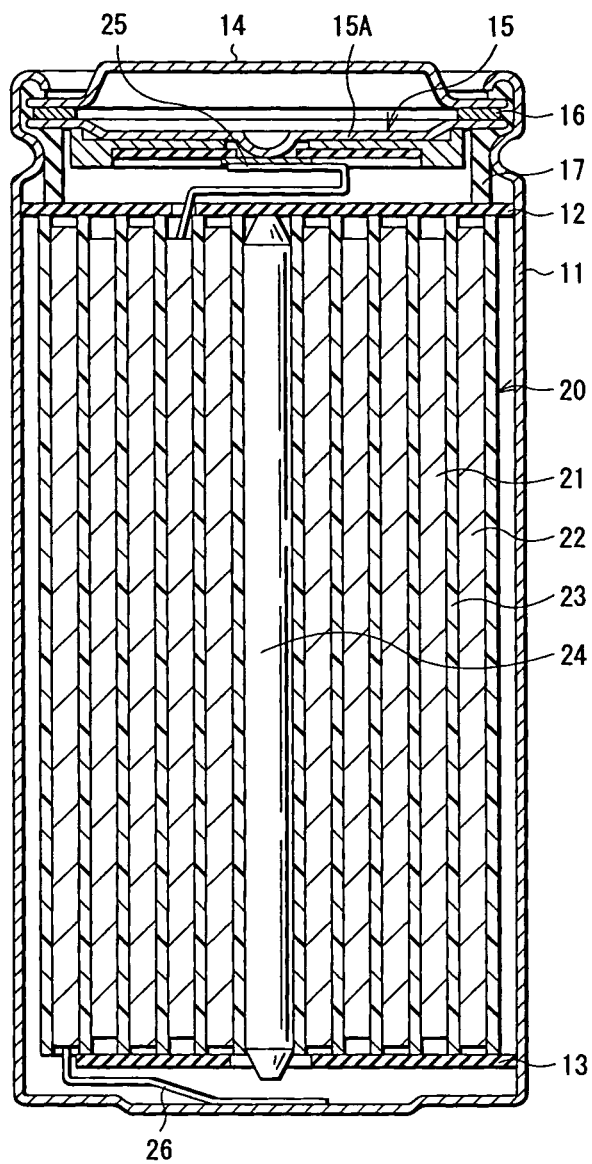
FIG. 1 is a cross sectional view which shows a construction of a secondary battery according to a first embodiment of the invention.

A secondary battery according to a first embodiment of the invention is a so-called lithium ion secondary battery, wherein an anode capacity is expressed by a capacity component by insertion and extraction of lithium, which is a light metal. FIG. 1 shows a construction of the secondary battery. This secondary battery is a so-called cylinder-type battery, and comprises a battery device 20 wherein a strip-shaped cathode 21 and a strip-shaped anode 22 are wound sandwiching a separator 23 inside a battery can 11 in the shape of an approximately hollow cylinder. The battery can 11 is made of, for example, iron (Fe) plated by nickel (Ni). One end of the battery can 11 is closed, and the other end thereof is opened. Inside the battery can 11, a pair of insulating plates 12 and 13 are respectively arranged so that the battery device 20 is sandwiched between the insulating plates 12 and 13, and the insulating plates 12 and 13 are located perpendicular to the winding periphery face.

At the open end of the battery can 11, a battery cover 14 and a safety valve mechanism 15 and a PTC (Positive Temperature Coefficient) device 16 provided inside this battery cover 14 are mounted through caulking by a gasket 17. Inside of the battery can 11 is sealed. The battery cover 14 is, for example, made of a material similar to that of the battery can 11. The safety valve mechanism 15 is electrically connected to the battery cover 14 through the PTC device 16. When an inner pressure of the battery becomes a certain level or more by inner short circuit or exterior heating, a disk plate 15A flips to cut the electrical connection between the battery cover 14 and the battery device 20. When a temperature rises, the PTC device 16 limits a current by increasing its resistance value to prevent abnormal heat generation by a large current. The gasket 17 is made of, for example, an insulating material and its surface is coated with asphalt.

The battery device 20 is, for example, wound, and a center pin 24 is inserted in the center of the battery device 20. A cathode terminal 25 made of aluminum (Al) or the like is connected to the cathode 21 of the battery device 20. An anode terminal 26 made of nickel or the like is connected to the anode 22 of the battery device 20. The cathode terminal 25 is electrically connected to the battery cover 14 by being welded to the safety valve mechanism 15. The anode terminal 26 is welded and electrically connected to the battery can 11.

Figure 2:
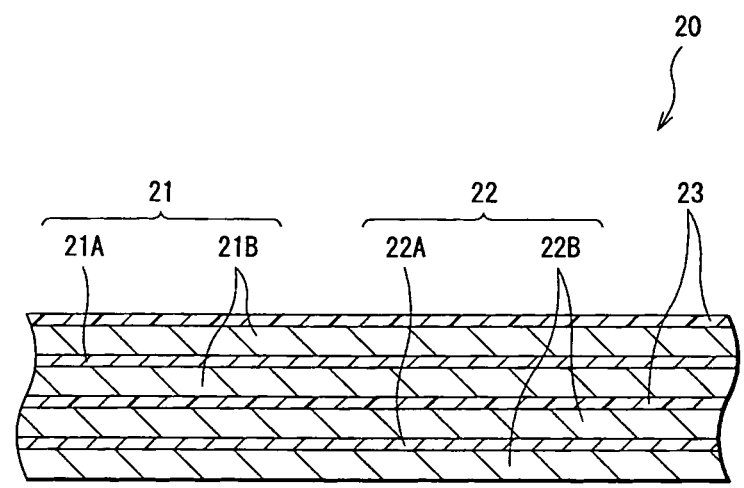
FIG. 2 is an expanded cross sectional view of part of a battery device shown in FIG. 1.

FIG. 2 is an enlarged view of part of the battery device 20 shown in FIG. 1. The cathode 21 comprises, for example, a cathode current collector 21A having a pair of facing faces and cathode active material layer 21B provided on both sides or on a single side of the cathode current collector 21A. The cathode current collector 21A is made of, for example, a metal foil such as an aluminum foil, a nickel foil, and a stainless foil.

The cathode active material layer 21B contains, for example, one or more cathode materials capable of inserting and extracting lithium as a cathode active material. In addition, the cathode active material layer 21B can also include a conductive agent such as carbon materials and a binder such as polyvinylidene fluoride as necessary. As a cathode material capable of inserting and extracting lithium, for example, the material which contains sufficient amount of lithium is preferable. For example, complex oxides containing lithium and transition metals, and interlayer compounds containing lithium are suitable. Specially, a complex oxide which contains at least one from the group consisting of cobalt (Co), nickel, manganese (Mn), iron, vanadium (V), and titanium (Ti) as a transition metal is more preferable. In addition, a complex oxide, wherein part of a transition metal element is substituted with other element such as aluminum is also preferable. Examples of such a complex oxide include one expressed by a chemical formula of $Li_{x1}MIO_2$ (Mi represents one or more transition metals. Values of x1 differ depending on charge and discharge state of the battery, and the values are generally in the range of $0.05 \le x1 \le 1.10$.) and one expressed by a chemical formula of $Li_{x2}MIIPO_4$ (MII represents one or more transition metals. Values of x2 differ depending on charge and discharge state of the battery, and the values are generally in the range of $0.05 \le x2 \le 1.10$.). More specifically, examples of such a complex oxide include cobalt acid lithium, nickel acid lithium, cobalt nickel acid lithium, lithium manganate having a spinel type crystal structure, and iron phosphate lithium having an olivine type crystal structure.

The anode 22 comprises, for example, an anode current collector 22A having a pair of facing faces and anode active material layer 22B provided on both sides or on a single side of the anode current collector 22A. The anode current collector 22A is preferably made of, for example, copper (Cu), stainless, nickel, titanium, tungsten (W), molybdenum (Mo), or aluminum. Specially, in some cases, the anode current collector 22A is preferably made of a metal easy to be alloyed with the anode active material layer 22B. For example, as described later, when the anode active material layer 22B contains at least one from the group consisted of simple substances and compounds of silicon (Si) and tin (Sn), copper, titanium, aluminum, and nickel can be cited as a material easy to be alloyed with the anode active material layer 22B. Though the anode current collector 22A can be constructed by a single layer, it can be also constructed by several layers. In this case, it is possible that a layer contacting with the anode active material layer 22B is made of the metal material easy to be alloyed with the anode active material layer 22B, and other layers are made of other metal material.

The anode active material layer 22B contains, for example, an anode material capable of inserting and extracting lithium as an anode active material. A quantity of the anode material capable of inserting and extracting lithium is relatively larger than that of the cathode active material. Therefore, in this secondary battery, a lithium metal is not precipitated on the anode 22 during charge. That is, this secondary battery is a so-called lithium ion secondary battery as described above. In this specification, insertion and extraction of lithium means electrochemical insertion and extraction of lithium ions without loosing ionicity of lithium ions. "Without loosing ionicity" includes not only the perfect ionicity, but also imperfect ionicity. For example, occlusion of lithium ions into graphite due to electrochemical intercalation reaction can be cited. Further, occlusion of lithium into an alloy containing an intermetallic compound and occlusion of lithium due to formation of an alloy can be cited.

Examples of the anode material capable of inserting and extracting lithium include carbon materials, metal oxides, and high molecular weight compounds. Examples of the carbon materials include graphitizable carbon, non-graphitizable carbon whose face interval of face (002) is 0.37 nm or more, and graphite whose face interval of face (002) is 0.340 nm or less. More concrete examples include pyrolytic carbons, cokes, graphite, glassy carbons, organic high molecular weight compound firing body, carbon fibers, and activated carbons. The cokes include pitch cokes, needle cokes, and petroleum cokes. The organic high molecular weight compound firing body mean ones obtained by firing at appropriate temperatures and carbonizing high molecular weight compound such as a phenol resin and a furan resin. Examples of the metal oxides include iron oxide, ruthenium oxide, and molybdenum oxide. Examples of the high molecular weight compound include polyacetylene and polypyrrole.

In addition, examples of the anode material capable of inserting and extracting lithium include simple substances, alloys, and compounds of metal elements or metalloid elements which can form an alloy with lithium. In this specification, examples of the alloys include alloys consisting of two or more metal elements and, in addition, alloys consisting of one or more metal elements and one or more metalloid elements. Examples of structures of the materials include a solid solution structure, a eutectic (eutectic mixture) structure, an intermetallic compound structure, and a concomitant state comprised of two or more of the foregoing structures.

Examples of the metal elements or the metalloid elements include tin, lead (Pb), aluminum, indium (In), silicon, zinc (Zn), copper, cobalt, antimony (Sb), bismuth (Bi), cadmium (Cd), magnesium (Mg), boron (B), gallium (Ga), germanium (Ge), arsenic (As), silver (Ag), hafnium (Hf), zirconium (Zr), and yttrium (Y). Examples of alloys or compounds thereof include ones which are expressed by a chemical formula of $Ma_yMb_z$ In this chemical formula, Ma represents at least one of metal elements and metalloid elements capable of forming an alloy with lithium, and Mb represents at least one of elements other than Ma. Values of y and z satisfy y>0 and z≥0, respectively.

Specially, simple substances, alloys, or compounds of metal elements or metalloid elements in Group 14 in the long-period periodic table are preferable. Simple substances, alloys, and compounds of silicon and tin are particularly preferable, since their ability to insert and extract lithium is high, and they can improve energy density of the anode 22 compared to graphite depending on applied combination. These materials can be crystalline or amorphous ones.

Concrete examples of such alloys and compounds include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0≤v≤2), $SnO_w$ (0≤w≤2), $SnSiO_3$, LiSiO, and LiSnO.

This anode active material layer 22B is formed, for example, by coating, and can include a binder such as polyvinylidene fluoride in addition to the anode active material. Further, the anode active material layer 22B can be formed by at least one method from the group consisting of gas phase method, liquid phase method, and sinter method. This case is preferable, since destruction by expansion or shrinkage of the anode active material layer 22B due to charge and discharge can be inhibited, the anode current collector 22A and the anode active material layer 22B can be unified, and electronic conductivity in the anode active material layer 22B can be improved. Further, this case is preferable since a binder, voids and the like can be reduced or excluded, and the anode 22 can become a thin film.

It is preferable that the anode active material layer 22B is alloyed with the anode current collector 22A on at least part of the interface with the anode current collector 22A. More specifically, it is preferable that on the interface, component elements of the anode current collector 22A are diffused into the anode active material layer 22B, or component elements of the anode active material are diffused into the anode current collector 22A, or component elements of both the anode current collector 22A and the anode active material 22B are diffused into each other. This alloying often arises concurrently with forming the anode active material layer 22B by gas phase method, liquid phase method, or sinter method. However, the alloying can be caused by further heat treatment.

The separator 23 is intended to separate the cathode 21 from the anode 22, prevent current short circuit by contact between the cathode and the anode, and let through lithium ions. The separator 23 is constructed of, for example, a porous film made of a synthetic resin of polytetrafluoro ethylene, polypropylene, polyethylene and the like, or a porous film made of an inorganic material such as a ceramics nonwoven cloth. The separator 23 can have a structure in which two or more of the foregoing porous films are layered. Specially, the porous film made of polyolefin is preferable since it has an excellent short circuit prevention effect, and has ability to improve battery safety by shutdown effect. In particular, polyethylene is preferable since it has ability to obtain shutdown effect in the range of 100° C. to 160° C., and it has excellent electrochemical stability. In addition, polypropylene is preferable. It is possible to use other resin with chemical stability by copolymerizing with polyethylene or polypropylene, or blending them.

An electrolytic solution, which is a liquid electrolyte, is impregnated in this separator 23. This electrolytic solution contains, for example, a solvent and an electrolyte salt dissolved in this solvent. The electrolytic solution also contains an additive as necessary. As a solvent, various conventionally used nonaqueous solvents can be used. Concrete examples of the solvent include cyclic carbonic acid esters such as ethylene carbonate, propylene carbonate, butylene carbonate, and vinylene carbonate; chain esters such as dimethyl carbonate, diethyl carbonate, and ethyl methyl carbonate; carboxylate esters such as methyl acetate, methyl propionate, and methyl butyrate; and ethers such as γ-butyrolactone, γ-valerolactone, sulfolane (tetrahydrothiophene-1,1-dioxide), tetrahydrofuran, 2-methyl tetrahydrofuran, and 1,2-dimethoxy ethane.

As an electrolyte salt, a first electrolyte salt comprised of at least one of metallic salts having a structure expressed by Chemical formula 2 is contained. That is, this electrolytic solution contains one or more of a first anions expressed by [B(RF1)(RF2)(RF3)RF4]$^-$. Therefore, battery characteristics such as high temperature storage characteristics can be improved. As an electrolyte salt, a lithium salt is preferable. However, not only the lithium salt, but also other metallic salts such as a sodium salt, a potassium salt, a magnesium salt, a calcium salt, and an aluminum salt can be used. Lithium contributing to charge and discharge reaction can be supplied by the cathode 21 and the like.

[Chemical formula 2]

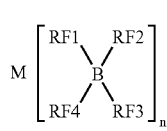

In Chemical formula 2, M represents a metal element, and RF1, RF2, RF3, and RF4 represent a perfluoro alkyl group whose number of fluorine or carbon is from 1 to 12, respectively. RF1, RF2, RF3, and RF4 can be identical or different from each other n represents an ionic valency of the metal element M. The perfluoro alkyl group is a group formed by substituting hydrogen of the alkyl group with fluorine, is expressed by, for example, a chemical formula of $C_kF_{2k+1}$ (1≤k≤12), and its shape can be a straight-chain shape or a branched-shape.

Examples of lithium salts of the first electrolyte salt include Li[B(CF$_3$)$_4$], Li[BF(CF$_3$)$_3$], Li[BF$_2$(CF$_3$)$_2$], Li[BF$_3$(CF$_3$)], Li[B(C$_2$F$_5$)$_4$], Li[BF$_3$(C$_2$F$_5$)], Li[BF$_2$(C$_2$F$_5$) 2], Li[BF(C$_2$F$_5$) 3], and Li[B(C$_3$F$_7$)$_4$].

As electrolyte salts, it is preferable to use one or more of a second electrolyte salts in addition to the first electrolyte salt. That is, the electrolytic solution preferably contains other second anions in addition to the first anions expressed by [B(RF1)(RF2)(RF3)RF4]$^-$, since inner resistance can be reduced, and characteristics can be further improved. Examples of the second anions include B(C$_6$H$_5$)$_4$$^-$, CH$_3$SO$_3$$^-$, CF$_3$SO$_3$$^-$, AlCl$_4$$^-$, SiF$_6$$^-$, Cl$^-$, Br$^-$, PF$_6$$^-$, BF$_4$$^-$, ClO$_4$$^-$, AsF$_6$$^-$, anions expressed by Chemical formula 3, and anions expressed by Chemical formula 4. Concrete examples of the anions expressed by Chemical formula 3 include [N(CF$_3$SO$_2$)$_2$]$^-$, [N(C$_2$F$_5$SO$_2$)$_2$]$^-$, and [N(C$_4$F$_9$SO$_2$)(CF$_3$SO$_2$)]$^-$. Concrete examples of the anions expressed by Chemical formula 4 include [C(CF$_3$SO$_2$)$_3$]$^-$ or the like.

[Chemical formula 3]

In Chemical formula 3, i and j are integer numbers of 1 or more.

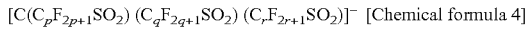
[Chemical formula 4]

In Chemical formula 4, p, q, and r are integer numbers of 1 or more.

Specially, as the second anions, at least one from the group consisting of PF$_6$$^-$, BF$_4$$^-$, ClO$_4$$^-$, AsF$_6$$^-$, anions expressed by Chemical formula 3, and anions expressed by Chemical formula 4 are preferably contained, since higher effect can be obtained and high conductivity can be obtained. In particular, it is preferable to contain PF$_6$$^-$. It is more preferable to further contain other second anion, for example, at least one from the group consisting of BF$_4$$^-$, ClO$_4$$^-$, AsF$_6$$^-$, anions expressed by Chemical formula 3, and anions expressed by Chemical formula 4 in addition to PF$_6$$^-$.

A moisture content in the electrolytic solution is preferably 100 ppm or less at a mass ratio in relation to the electrolytic solution. It is more preferable that no moisture is contained. When a moisture content is large, the foregoing first electrolyte salt or the first anions may be decomposed at high temperatures, and high temperature storage characteristics may deteriorate.

This secondary battery can be manufactured as follows, for example.

First, for example, the cathode 21 is fabricated by forming the cathode active material layer 21B on the cathode current collector 21A. For example, the cathode active material layer 21B is formed as follows. First, cathode active material powders, a conductive agent such as carbon materials, and a binder such as polyvinylidene fluoride are mixed to prepare a cathode mixture. This cathode mixture is dispersed in a carrier fluid such as N-methyl-2-pyrrolidone to obtain a cathode mixture slurry. Next, this cathode mixture slurry is applied to the cathode current collector 21A, dried, and compression-molded to form the cathode active material layer 21B.

Further, for example, the anode 22 is fabricated by forming the anode active material layer 22B on the anode current collector 22A. For example, the anode active material layer 22B is formed as follows. First, anode active material powders and a binder such as polyvinylidene fluoride are mixed to prepare an anode mixture. This anode mixture is dispersed in a carrier fluid such as N-methyl-2-pyrrolidone to obtain an anode mixture slurry. Next, this anode mixture slurry is applied to the anode current collector 22A, dried, and compression-molded to form the anode active material layer 22B.

Further, the anode active material layer 22B can be formed by depositing the anode active material on the anode current collector 22A by using gas phase method or liquid phase method. Furthermore, the anode active material layer 22B can be formed by sinter method, wherein a precursor layer containing a particulate anode active material is formed on the anode current collector 22A, and then sintered. The anode active material layer 22B can be formed by combining two or more methods from gas phase method, liquid phase method, and sinter method. In some cases, by forming the anode active material layer 22B by using at least one method from the group consisting of gas phase method, liquid phase method, and sinter method, the anode active material layer 22B whose at least part of interface with the anode current collector 22A is alloyed with the anode current collector 22A can be formed.

In order to further alloy the interface between the anode current collector 22A and the anode active material layer 22B, it is possible to perform heat treatment under vacuum atmosphere or non-oxidization atmosphere. In particular, when the anode active material layer 22B is formed by plating described later, the anode active material layer 22B may be hard to be alloyed even on the interface with the anode current collector 22A. Therefore, in this case, this heat treatment is preferably performed as necessary. Further, when the anode active material layer 22B is formed by gas phase method, further alloying the interface between the anode current collector 22A and the anode active material layer 22B may also improve the characteristics. Therefore, in this case, this heat treatment is also preferably performed as necessary.

As a gas phase method, for example, physical deposition method or chemical deposition method can be used. More specifically, vacuum deposition method, sputtering method, ion plating method, laser ablation method, thermal CVD (chemical vapor deposition) method, and plasma CVD method can be utilized. As a liquid phase method, known methods such as electrolytic plating and non-electrolytic plating can be utilized. Regarding the sinter method, known methods can be utilized. For example, atmospheric sinter method, reaction sinter method, and hot press sinter method can be utilized.

Subsequently, the cathode terminal 25 is attached on the cathode current collector 21A by welding or the like, and the anode terminal 26 is attached on the anode current collector 22A by welding or the like. After that, the cathode 21 and the anode 22 are wound with the separator 23 in between. An end of the cathode terminal 25 is welded to the safety valve mechanism 15, and an end of the anode terminal 26 is welded to the battery can 11. The wound cathode 21 and anode 22 are sandwiched between the pair of insulating plates 12 and 13, and the cathode 21 and the anode 22 are thereby housed inside the battery can 11. After housing the cathode 21 and the anode 22 inside the battery can 11, an electrolytic solution is injected into the battery can 11, and impregnated in the separator 23. After that, at the open end of the battery can 11, the battery cover 14, the safety valve mechanism 15, and the PTC device 16 are fixed through caulking by the gasket 17. The secondary battery of this embodiment is thereby completed.

In this secondary battery, when charged, lithium ions are extracted from the cathode 21, and are inserted in the anode 22 through the electrolytic solution. When discharged, for example, lithium ions are extracted from the anode 22, and are inserted in the cathode 21 through the electrolytic solution. In this case, the electrolytic solution contains the first anions expressed by $[B(RF1)(RF2)(RF3)RF4]^-$. Therefore, a high capacity can be obtained even when stored at high temperatures.

As above, according to this embodiment, the electrolytic solution contains the first anions expressed by $[B(RF1)(RF2)(RF3)RF4]^-$. Therefore, battery characteristics such as high temperature storage characteristics can be improved.

In particular, when the other second anions are contained in addition to the first anions, characteristics can be further improved by reduction of inner resistance or the like.

Further, when a moisture content in the electrolytic solution is 100 ppm or less at a mass ratio in relation to the electrolytic solution, high temperature storage characteristics can be further improved.

[Second Embodiment]

Figure 3:
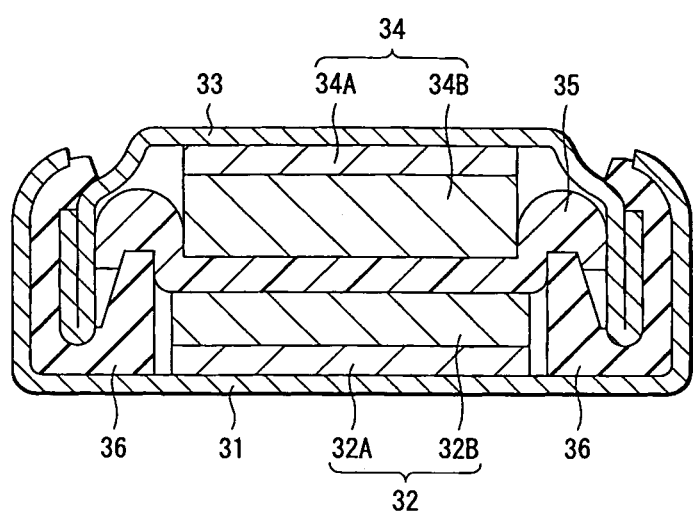
FIG. 3 is a cross sectional view which shows a construction of a secondary battery according to a second embodiment of the invention.

A secondary battery according to the second embodiment of the invention is a so-called lithium metal secondary battery, whose anode capacity is expressed by a capacity component by precipitation and dissolution of lithium, which is a light metal. FIG. 3 is a construction of this secondary battery. This secondary battery is a so-called coin-type secondary battery. A plate-shaped cathode 32 housed in an exterior cup 31 and a plate-shaped anode 34 housed in an exterior cup 33 are layered with a separator 35 in between. Peripheral edges of the exterior can 31 and the exterior cup 33 are hermetically closed by caulking through an insulating gasket 36. The exterior can 31 and the exterior cup 33 are made of, for example, a metal such as stainless and aluminum, respectively.

The cathode 32 comprises a cathode current collector 32A having a pair of facing faces and a cathode active material layer 32B provided on a single side of the cathode current collector 32A. The anode 34 comprises an anode current collector 34A having a pair of facing faces and an anode active material layer 34B provided on a single side of the anode current collector 34A. Constructions of the cathode current collector 32A, the cathode active material layer 32B, the anode current collector 34A, and the separator 35 are similar to those of the first embodiment.

The anode active material layer 34B is made of a lithium metal precipitated during charge. The anode active material layer 34B does not exist in assembling, and is dissolved during discharge. That is, in this secondary battery, the lithium metal is used as an anode active material.

This secondary battery can be manufactured in a manner similar to in the first embodiment, except that the anode active material layer 34B is formed by charge.

In this secondary battery, when charged, for example, lithium ions are extracted from the cathode 32, and are deposited on the surface of the anode current collector 34A as a lithium metal through the electrolytic solution. In result, the anode active material layer 34B is formed as shown in FIG. 3. When discharged, for example, the lithium metal is eluted from the anode active material layer 34B as lithium ions, and is inserted in the cathode 32 through the electrolytic solution.

As above, in this embodiment, the electrolyte contains the first anions expressed by $[B(RF1)(RF2)(RF3)RF4]^-$. Therefore, the effects similar to those in the first embodiment can be obtained. In addition, in this embodiment, the lithium metal is used as an anode active material, and a capacity of the anode 34 is expressed as a capacity component by precipitation and dissolution of lithium. Therefore, high energy density can be obtained.

In the foregoing secondary battery, a case wherein the anode active material layer 34B is formed during charge has been described. However, it is possible to construct the secondary battery so that it already comprises the anode active material layer 34B when assembling. In this case, as in the foregoing secondary battery, it is possible to provide the anode active material layer 34B on the anode current collector 34A, but it is also possible that the anode active material layer 34B is utilized as a current collector as well, and the anode current collector 34A is omitted.

[Third Embodiment]

In a secondary battery according to the third embodiment of the invention, an anode capacity includes a capacity component by insertion and extraction of lithium, which is a light metal, and a capacity component by precipitation and dissolution of the lithium, and the anode capacity is expressed by the sum of the foregoing two capacity components. This secondary battery has a construction and effects similar to those of the first embodiment, and can be manufactured in a manner similar to in the first embodiment, except that a construction of the anode active material layer is different from that of the first embodiment. Therefore, descriptions will be given with reference to FIG. 1 and by using the same symbols. Detailed descriptions on the same parts will be omitted.

The anode active material layer 22B contains an anode material capable of inserting and extracting lithium at a relatively small rate in relation to the cathode active material. Therefore, in this secondary battery, lithium metal is precipitated on the surface of the anode material during charge. More specifically, the lithium metal is precipitated on the surface of the anode material in a state that an open circuit voltage is lower than an overcharge voltage. As described above, a capacity of the anode 22 includes a capacity component by insertion and extraction of lithium and a capacity component by precipitation and dissolution of lithium, and the capacity of the anode 22 is expressed by the sum of these two capacity components. That is, in this secondary battery, the anode material capable of inserting and extracting lithium is used as a basic material when the lithium metal is precipitated, and both the anode material and the lithium metal are used as anode active materials. The overcharge voltage means an open circuit voltage when the battery becomes in an overcharge state. For example, the overcharge voltage means higher voltage than the open circuit voltage of a "perfectly charged" battery, which is described and defined in "Guideline for safety assessment of lithium secondary batteries" (SBA G1101), one of the guidelines speculated by Japan Storage Battery Industrial Incorporated (Battery Association of Japan). In other words, the overcharge voltage means a higher voltage than the open circuit voltage after charge by using a charging method used in obtaining nominal capacities of respective batteries, the standard charging method, or a recommended charging method.

This secondary battery is similar to the conventional lithium ion secondary battery in respect of using the anode material capable of inserting and extracting lithium for the anode 22. Further, this secondary battery is similar to the conventional lithium metal secondary battery in respect of precipitating lithium metal on the anode 22. However, by depositing the lithium metal on the anode material capable of inserting and extracting lithium, the following merits are created.

Firstly, the anode material capable of inserting and extracting lithium has a large surface area generally. Therefore, the lithium metal can be precipitated uniformly. Secondly, since the lithium metal can be also deposited on gaps between particles of the anode material, its volume change is small. Thirdly, insertion and extraction of lithium by the anode material contribute to the charge and discharge capacity. Therefore, precipitation and dissolution quantities of lithium metal are small in proportion to a large battery capacity. Fourthly, during initial charge, lithium is inserted in the anode material. Therefore, rapid charge is enabled.

In this secondary battery, when charged, lithium ions are extracted from the cathode 21, and are firstly inserted in the anode material capable of inserting and extracting lithium contained in the anode 22 through the electrolytic solution. When further charged, the lithium metal begins to precipitate on the surface of the anode material in a state that an open circuit voltage is lower than an overcharge voltage. After that, the lithium metal continues to precipitate on the anode 22 until the end of charge.

Subsequently, when discharged, first, the lithium metal precipitated on the anode 22 elutes as ions, and is inserted in the cathode 21 through the electrolytic solution. When further discharged, the lithium ions inserted in the anode material in the anode 22 are extracted, and inserted in the cathode 21 through the electrolytic solution.

As above, in this embodiment, both the anode material capable of inserting and extracting lithium and the lithium metal are used as an anode active material. A capacity of the anode 22 includes a capacity component by insertion and extraction of lithium and a capacity component by precipitation and dissolution of lithium. The capacity of the anode 22 is expressed as the sum of the two capacity components. Therefore, in the secondary battery of this embodiment, higher energy density can be obtained than in the lithium ion secondary battery, and charge and discharge cycle characteristics and rapid charge properties can be improved than in the lithium metal secondary battery. Further, in this embodiment, since the electrolyte contains the first anions expressed by $[B(RF1)(RF2)(RF3)RF4]^-$, similar effects as in the first embodiment can be obtained.

[Fourth Embodiment]

Figure 4:
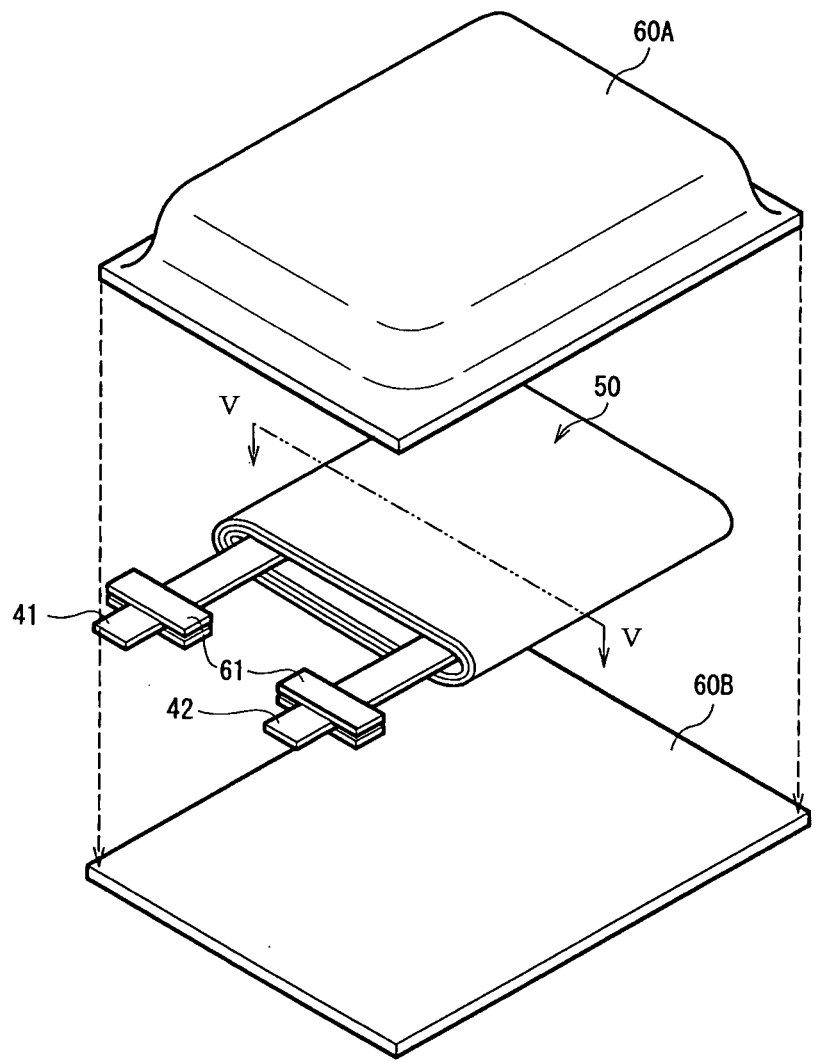
FIG. 4 is an oblique perspective figure which shows a construction of a secondary battery according to a fourth embodiment of the invention.

A secondary battery according to the fourth embodiment of the invention is a so-called lithium ion secondary battery as in the first embodiment. However, its shape and construction of the electrolyte are different from those of the first embodiment. FIG. 4 shows a construction of the secondary battery. In this secondary battery, a battery device 50 to which a cathode terminal 41 and an anode terminal 42 are attached is enclosed inside film-shaped exterior members 60A and 60B. The cathode terminal 41 and the anode terminal 42 are directed from inside to outside of the exterior members 60A and 60B, and, for example, are derived in the same direction. The cathode terminal 41 and the anode terminal 42 are respectively made of a metal material such as aluminum, copper, nickel, and stainless.

The exterior members 60A and 60B are made of a laminated film in the shape of a rectangle, wherein, for example, a nylon film, an aluminum foil, and a polyethylene film are bonded together in this order. The exterior members 60A and 60B are, for example, arranged so that their polyethylene film sides and the battery device 50 are faced, and respective outer edge parts are fusion bonded or adhered to each other by an adhesive. Adhesive films 61 to protect from outside air intrusion are inserted between the exterior member 60A and the cathode terminal 41, the exterior member 60B and the cathode terminal 41, the exterior member 60A and the anode terminal 42, and the exterior member 60B and the anode terminal 42. The adhesive film 61 is made of a material having contact properties in relation to the cathode terminal 41 and the anode terminal 42. For example, when the cathode terminal 41 and the anode terminal 42 are made of the foregoing metal material, the adhesive film 61 is preferably made of a polyolefin resin such as polyethylene, polypropylene, modified polyethylene, and modified polypropylene.

The exterior members 60A and 60B can be made of a laminated film having other structure, a high polymer film such as polypropylene, or a metal film, instead of the foregoing laminated film.

Figure 5:
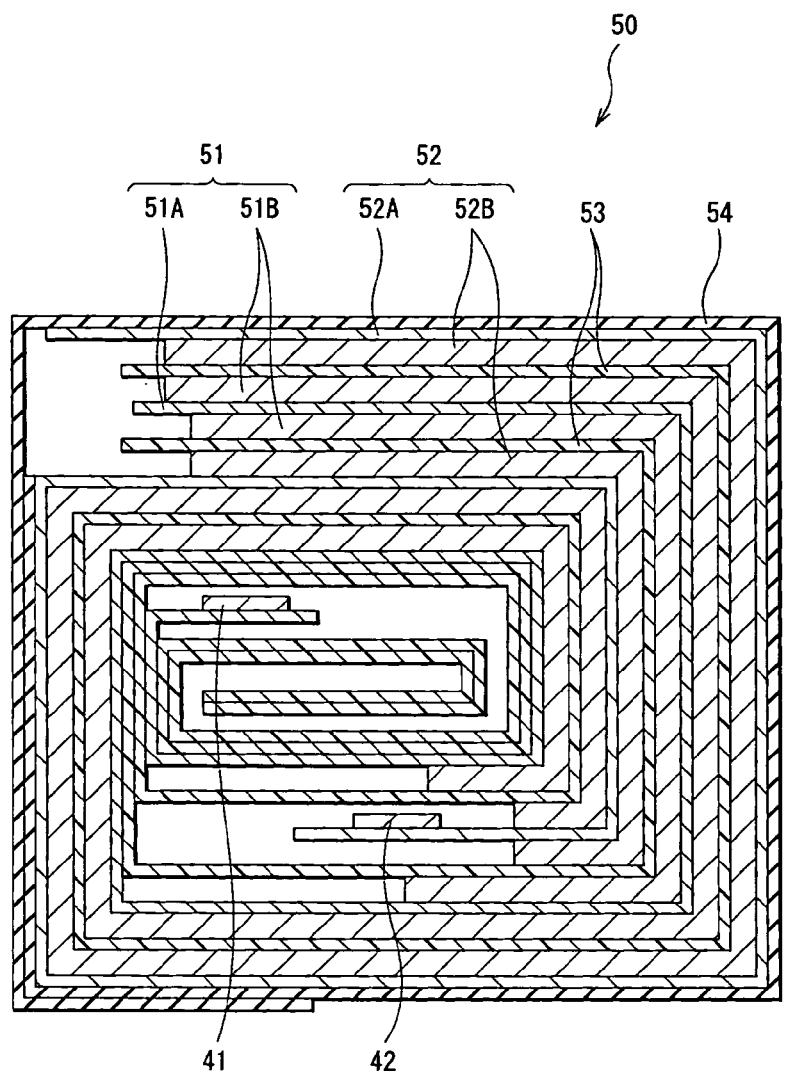
FIG. 5 is a cross sectional view which shows a construction taken along line V-V of a battery device shown in FIG. 4.

FIG. 5 is a view showing a cross sectional structure taken along line V-V of the battery device 50 illustrated in FIG. 4. In the battery device 50, a cathode 51 and an anode 52 are faced to each other sandwiching a separator 53 and wound. An outermost part of the battery device 50 is protected by a protective tape 54.

The cathode 51 comprises a cathode current collector 51A having a pair of facing faces and cathode active material layer 51B provided on both sides or on a single side of the cathode current collector 51A as in the first embodiment. The anode 52 comprises an anode current collector 52A having a pair of facing faces and anode active material layer 52B provided on both sides or on a single side of the anode current collector 52A as in the first embodiment. Constructions of the cathode current collector 51A, the cathode active material layer 51B, the anode current collector 52A, the anode active material layer 52B and the separator 53 are similar to those of the first embodiment.

A gelatinous electrolyte is impregnated in the battery device 50, more specifically in the cathode 51, the anode 52, and the separator 53. In this embodiment, as described later, the gelatinous electrolyte is, for example, formed by applying a coating solution wherein a high molecular weight compound is dissolved in a mixed solvent to at least one of the cathode 21 and the anode 22. The gelatinous electrolyte contains a high molecular weight compound and an electrolytic solution. A construction of the electrolytic solution, that is, a solvent and an electrolyte salt is similar to that of the first embodiment.

Examples of the high molecular weight compound include ether high molecular weight compounds such as polyethylene oxide and a cross linked polymer containing polyethylene oxide; ester high molecular weight compounds such as polymethacrylate; acrylate high molecular weight compounds; and vinylidene fluoride polymer such as polyvinylidene fluoride and a copolymer of vinylidene fluoride and hexafluoro propylene. One or more of the foregoing high molecular weight compounds are used by mixing. In particular, in view of redox stability, it is desirable to use a fluorinated high molecular weight compound such as vinylidene fluoride polymer.

This secondary battery can be manufactured as follows, for example.

First, as in the first embodiment, the cathode 51 and the anode 52 are formed. The cathode terminal 41 is attached to an end of the cathode current collector 51A by welding, and the anode terminal 42 is attached to an end of the anode current collector 52A by welding.

A coating solution is prepared by mixing a high molecular weight compound, an electrolytic solution, and a mixed solvent such as dimethyl carbonate while heating them. Next, the coating solution is applied and impregnated onto the cathode active material layer 51B and the anode active material layer 52B, respectively. The mixed solvent is volatilized to form a gelatinous electrolyte. It is not necessary to form this electrolyte on both the cathode 51 and the anode 52. It is possible to form the electrolyte on either the cathode 51 or the anode 52.

Next, the cathode 51 and the anode 52 on which the gelatinous electrolyte is formed are layered with the separator 53 in between to obtain the layered body. This layered body is wound in its longitudinal direction. The protective tape 54 is adhered to the outermost peripheral part to form the battery device 50.

Lastly, for example, the battery device 50 is sandwiched between the exterior members 60A and 60B, and the battery device 50 is enclosed by adhering outer edge parts of the exterior members 60A and 60B by thermal fusion bonding or the like. In this regard, the adhesive film 61 is inserted between the cathode terminal 41 and the exterior member 60A, the cathode terminal 41 and the exterior member 60B, the anode terminal 42 and the exterior member 60A, and the anode terminal 42 and the exterior member 60B. The secondary battery of this embodiment is thereby completed.

This secondary battery acts and provides effects as in the first embodiment.

[Fifth Embodiment]

A secondary battery according to the fifth embodiment of the invention has a construction similar to that of the fourth embodiment, except that construction of the gelatinous electrolyte is different. Therefore, descriptions will be given with reference to FIGS. 4 and 5 and by using the same symbols.

As described later, the gelatinous electrolyte is formed by firstly impregnating an electrolyte composition of matter containing a polymer compound and an electrolytic solution in the cathode 51 and the anode 52, and then polymerizing the polymer compound. The gelatinous electrolyte contains a high molecular weight compound having a structure wherein the polymer compound is polymerized and the electrolytic solution.

A polymer compound having an acrylate group or a methacrylate group, and no ether group is preferable. When the ether group exists, cations coordinate with the ether group, leading to lowered cation conductivity. Concrete examples of the polymer compound include monofunctional acrylate, monofunctional methacrylate, multifunctional acrylate, and multifunctional methacrylate, which contain no ether group. More concrete examples of the polymer compound include acrylic ester, ester methacrylate, acrylic nitrile, methacrylic nitrile, diacrylic ester, triacrylic ester, dimethacrylic ester, and trimethacrylic ester.

In particular, a compound having at least three structural parts of a structure expressed by Chemical formula 5, a structure expressed by Chemical formula 6, and a structure expressed by Chemical formula 7 is preferably used as a polymer compound. In this case, very excellent battery characteristics can be obtained. In this one compound, molar ratios of respective structural parts are, for example, $0.1 \leq \alpha \leq 98$, $0 \leq \beta \leq 98$, and $0.1 \leq \gamma \leq 98$, where the structural part of Chemical formula 5 is $\alpha$, the structural part of Chemical formula 6 is $\beta$, and the structural part of Chemical formula 7 is $\gamma$. Bonding relations among respective structural parts can be random. For example, respective structural parts can be bonded in a certain order repeatedly, or in a random order.

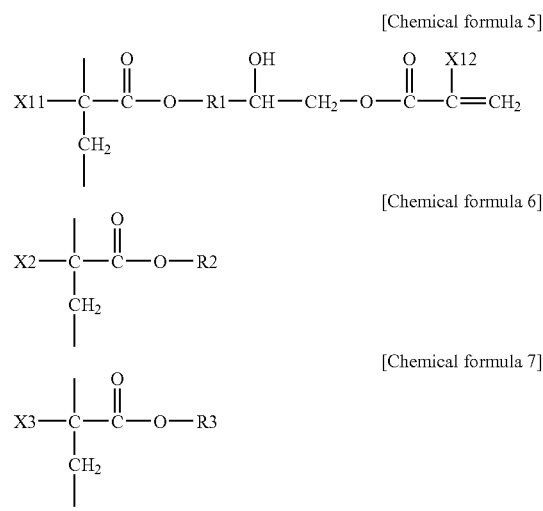

[Chemical formula 5]

[Chemical formula 6]

[Chemical formula 7]

In Chemical formulas 5 to 7, X11, X12, X2, and X3 represent a hydrogen atom or a methyl group (—CH$_3$), respectively. R1 represents a structural part containing carbon and no ether group. R1 is preferably an alkylene group whose number of carbon is 10 or less, and more specifically a methylene group (—CH$_2$—), an ethylene group (—CH$_2$ CH$_2$—), or the like. R2 represents a structural part containing a hydrogen atom or carbon and no ether group. R2 is preferably an alkyl group whose number of carbon is 10 or less, and its structure can be a branch structure, and can include cyclic structures. Concrete examples of R2 include a methyl group, an ethyl group (—CH$_2$ CH$_3$), a propyl group (—CH$_2$ CH$_2$ CH$_3$), an isopropyl group (—CH(CH$_3$)2), a butyl group (—CH$_2$ CH$_2$ CH$_2$ CH$_3$), a t-butyl group (—C(CH$_3$)$_3$), an s-butyl group (—CH(CH$_3$) CH$_2$ CH$_3$), a 2-ethylhexyl group (—CH$_2$ CH(C$_2$H$_5$) CH$_2$ CH$_2$ CH$_2$ CH$_3$), and a ciclohexyl group (—C$_6$H$_{11}$). R3 represents a structural part containing a hydrogen atom or carbon and no ether group. R3 is preferably an alkyl group whose number of carbon is 10 or less, or a group expressed by Chemical formula 8, or a group expressed by Chemical formula 9. The alkyl group can have a branch structure, and can include cyclic structures. Concrete examples of R3 include a methyl group, an ethyl group, a propyl group, an isopropyl group, a butyl group, a t-butyl group, an s-butyl group, a 2-ethylhexyl group, and a ciclohexyl group.

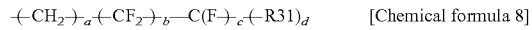  [Chemical formula 8]

In Chemical formula 8, R31 represents a hydrogen atom, a fluorine atom, or methyl fluoride (—CF$_3$) group. a is an integer number of 0 to 6, b is an integer number of 0 to 16, c is 1 or 2, and d is 1 or 2.

—R32-R33 [Chemical formula 9]

In Chemical formula 9, R32 represents a bivalent linkage group, and R33 represents a cyclic carbonate group.

A polymer compound having a group with ether bond and a polymerization group can be used. In particular, a compound having a group with ether bond in a side chain is preferable. As such a polymer compound, for example, a compound having a structure expressed by Chemical formula 10, a structure expressed by Chemical formula 11, and a structure expressed by Chemical formula 12 is preferable. With this compound, very excellent battery characteristics can be obtained. In this one compound, molar ratios of respective structural parts are, for example, $0.1 \leq A \leq 98$, $0 \leq B \leq 98$, and $0.1 \leq C \leq 98$, preferably $10 \leq A \leq 90$, $0 \leq B \leq 80$, and $10 \leq C \leq 80$, and more preferably $40 \leq A \leq 90$, $10 \leq B \leq 80$, and $10 \leq C \leq 70$ where the structural part of Chemical formula 10 is A, the structural part of Chemical formula 11 is B, and the structural part of Chemical formula 12 is C. Bonding relations among respective structural parts can be random. For example, respective structural parts can be bonded in a certain order repeatedly, or in a random order.

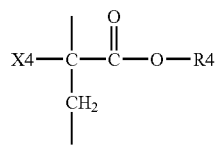
[Chemical formula 10]

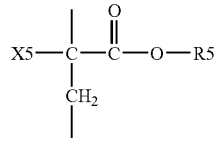
[Chemical formula 11]

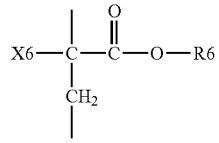
[Chemical formula 12]

In Chemical formulas 10 to 12, X4, X5, and X6 represent a hydrogen atom or a methyl group respectively. R4 represents a structural part having a polymerization group. R5 represents a structural part having a group with ether bond. R6 represents a structural part containing carbon.

As such a polymer compound, for example, a compound having a structure expressed by Chemical formula 13, a structure expressed by Chemical formula 14, and a structure expressed by Chemical formula 15 is preferable.

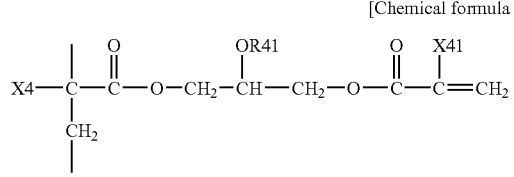
[Chemical formula 13]

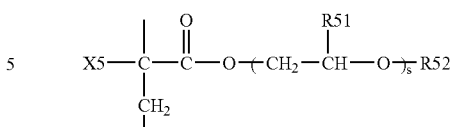
[Chemical formula 14]

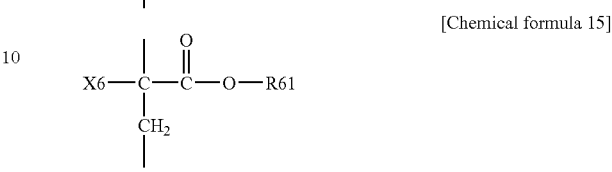
[Chemical formula 15]

In Chemical formulas 13 to 15, X4, X41, X5, and X6 represent a hydrogen atom or a methyl group, respectively. R41 represents a hydrogen atom or an alkyl group whose number of carbon is 5 or less, and preferably is a hydrogen atom or a methyl group. R51 represents a hydrogen atom or a methyl group. R52 represents an alkyl group whose number of carbon is 10 or less, or a group having an aromatic ring whose number of carbon is 12 or less, preferably is an alkyl group whose number of carbon is 5 or less or a group having an aromatic ring whose number of carbon is 8 or less, and more preferably is an alkyl group whose number of carbon is 3 or less. s is an integer number of 1 to 30, preferably is an integer number of 1 to 15, and more preferably is an integer number of 1 to 10. R61 is a group expressed by Chemical formula 16, an alkyl group whose number of carbon is 20 or less, a group having an aromatic ring whose number of carbon is 12 or less, a group expressed by Chemical formula 17, or a group expressed by Chemical formula 18. In the case of an alkyl group, an alkyl group whose number of carbon is 10 or less is more preferable, and an alkyl group whose number of carbon is 8 or less is much more preferable. In the case of a group having an aromatic ring, a group having an aromatic ring whose number of carbon is 8 or less is more preferable.

[Chemical formula 16]

—(CH$_2$—CH—O)$_t$—R63
      |
      R62

In Chemical formula 16, R62 represents a hydrogen atom or a methyl group. R63 represents an alkyl group whose number of carbon is 10 or less, or a group having an aromatic ring whose number of carbon is 12 or less. t represents an integer number of 0 to 30.

[Chemical formula 17]

In Chemical formula 17, R64 represents a hydrogen atom, a fluorine atom, or a methyl fluoride group. e represents an integer number of 0 to 10. f represents an integer number of 0 to 30. g represents an integer number of 1 or 2. h represents an integer number of 1 or 2.

—R65-R66 [Chemical formula 18]

In Chemical formula 18, R65 represents a bivalent linkage group, and R66 represents a cyclic carbonate group or a cyclic ether group.

As the polymer compound, only one kind can be used. However, it is desirable to use a mixture of a monofunctional body and a multifunctional body, or one or more multifunctional bodies. With such constructions, mechanical strength and electrolytic solution retention of a gelatinous electrolyte become easy to consist with each other.

A ratio of the high molecular weight compound in relation to the electrolytic solution is preferably from 3 parts by mass to 10 parts by mass in relation to the electrolytic solution of 100 parts by mass. When a ratio of the high molecular weight compound is low, sufficient mechanical strength cannot be obtained. When a ratio of the high molecular weight compound is high, ion conductivity is lowered.

This secondary battery can be manufactured as follows, for example.

First, the cathode 51 and the anode 52 are formed as in the first embodiment. After that, the cathode terminal 41 is attached to an end of the cathode current collector 51A by welding, and the anode terminal 42 is attached to an end of the anode current collector 52A by welding. Next, the separator 53, the cathode 51, the separator 53, and the anode 52 are sequentially layered and wound. The protective tape 54 is adhered to the outermost peripheral part to form a winding electrode body. Subsequently, this winding electrode body is sandwiched between the exterior members 60A and 60B, and thermal fusion bonding is applied to outer peripheral edge parts except for one side to obtain a pouched state.

After that, an electrolyte composition of matter containing the foregoing electrolytic solution and the polymer compound, and an polymerization initiator if necessary is prepared. This electrolyte composition of matter is injected into the winding electrode body from the opening of the exterior members 60A and 60B. Then, thermal fusion bonding is applied to the opening of the exterior members 60A and 60B to enclose the winding electrode body. As a polymerization initiator, known substances can be used. Examples of the polymerization initiator include an azobis compound, peroxide, hydroperoxide, peroxyester, and a redox catalyst. Concrete examples of the polymerization initiator include potassium persulfate, ammonium persulfate, t-butyl peroctoate, benzoyl peroxide, isopropyl percarbonate 2,4-dichlorobenzoyl peroxide, methyl ethyl ketone peroxide, cumene hydro peroxide, azobis isobutyro nitrile, 2,2'-azobis (2-amino dipropane) hydro chloride, t-butyl peroxineodecanoate, t-hexyl peroxineodecanoate, 1,1,3,3-tetramethyl butyl peroxineodecanoate, t-butylperoxipivarate, t-hexylperoxipivarate, 1,1,3,3-tetramethyl butyl peroxi-2-ethylhexanoate, t-butylperoxi-2-ethyl hexanoate, t-butyl peroxiisobutyrate, t-butylperoxi-3,5,5-trimethyl hexanoate, t-butyl peroxilaurate, and t-butyl peroxi acetate.

Specially, peroxyester polymerization initiators such as t-butyl peroxineodecanoate, t-hexyl peroxineodecanoate, 1,1,3,3-tetramethyl butyl peroxineodecanoate, t-butylperoxipivarate, t-hexylperoxipivarate 1,1,3,3-tetramethyl butyl peroxi-2-ethylhexanoate, t-butylperoxi-2-ethyl hexanoate, t-butyl peroxiisobutyrate, t-butylperoxi-3,5,5-trimethyl hexanoate, t-butyl peroxilaurate, and t-butyl peroxi acetate are preferable. With such a peroxyester polymerization initiator, gas generation during gelation can be inhibited, sufficient gelation can be realized and sufficient mechanical strength can be obtained even when a ratio of the polymerization compound is lowered.

Next, a gelatinous electrolyte is formed by heating the winding electrode body wherein the electrolyte composition of matter is injected from outside the exterior members 60A and 60B to polymerize the polymer compound. In this regard, heating temperatures are preferably 90° C. or less, and more preferably 75° C. or less. The secondary battery of this embodiment is thereby completed.

This secondary battery can be also manufactured as follows. For example, instead of injecting the electrolyte composition of matter after fabricating the winding electrode body, it is possible that the cathode 51 and the anode 52 are wound after application of the electrolyte composition of matter on the cathode 51 and the anode 52, the winding body is enclosed inside the exterior members 60A and 60B, and then heated. It is also possible that the cathode 51 and the anode 52 are wound after the electrolyte composition of matter is applied on the cathode 51 and the anode 52 and gelatinous electrolyte is formed by heating, and then the winding electrode body is enclosed inside the exterior members 60A and 60B. However, it is preferable that heating is performed after the winding electrode body is enclosed inside the exterior members 60A and 60B. If the cathode 51 and the anode 52 are wound after forming the gelatinous electrolyte by heating, interface connection between the gelatinous electrolyte and the separator 53 may become insufficient, and an inner resistance may become high.

This secondary battery acts and provides effects as in the first embodiment. In particular, when the electrolyte contains the high molecular weight compound having a structure wherein the polymer compound having an acrylate group or a methacrylate group and no ether group is polymerized, high temperature storage characteristics can be further improved.

EXAMPLES

Further descriptions will be given of concrete examples of the invention.

Examples 1-1 to 1-11

Lithium ion secondary batteries whose anode capacity is expressed by a capacity component by insertion and extraction of lithium were fabricated. In these Examples, coin-type secondary batteries shown in FIG. 3 were fabricated. Therefore, descriptions will be given by using the same symbols as in FIG. 3.

First, the cathode 32 was formed as below. Constitutions of the cathodes 32 of Examples 1-1 to 1-11 were identical. First, lithium carbonate ($Li_2CO_3$) and cobalt carbonate ($CoCO_3$) were mixed at a molar ratio of $Li_2CO_3:CoCO_3=0.5:1$. The mixture was fired for 5 hours at 900° C. in the air to obtain cobalt acid lithium ($LiCoO_2$) as a cathode active material. Next, 91 parts by mass of obtained cobalt acid lithium, 6 parts by mass of graphite as a conducting supportive agent, and 3 parts by mass of polyvinylidene fluoride as a binder were mixed to prepare a cathode mixture. Subsequently, this cathode mixture was dispersed in N-methyl-2-pyrolidone of a solvent to obtain a cathode mixture slurry. This cathode mixture slurry was uniformly applied on the cathode current collector 32A made of an aluminum foil having a thickness of 20 µm, dried, and compression-molded by a rolling press machine to form the cathode active material layer 32B. Then, the obtained cathode 32 was punched in the shape of a circle having a diameter of 15 mm.

The anode 34 was formed as follows. Constitutions of the anodes 34 were different among Examples 1-1 to 1-3, Examples 1-4 to 1-5, Examples 1-6 to 1-8, and Examples 1-9 to 1-11 from each other. In Examples 1-1 to 1-8, first, as an anode active material, either artificial graphite powders, copper-tin (CuSn) alloy powders, or silicon powders were prepared. 90 parts by mass of anode active material and 10 parts by mass of polyvinylidene fluoride as a binder were mixed to prepare an anode mixture. Subsequently, this anode mixture was dispersed in N-methyl-2-pyrrolidone of a solvent to obtain an anode mixture slurry. The anode mixture slurry was uniformly applied on the anode current collector 34A made of a copper foil having a thickness of 15 μm or 10 μm, dried, and compression-molded by a rolling press machine to form the anode active material layer 34B. The obtained anode 34 was punched in the shape of a circle having a diameter of 16 mm. In Examples 1-9 to 1-11, the anode active material layer 34B made of silicon was formed on the anode current collector 34A made of a copper foil having a thickness of 15 μm by using electronic beam deposition method. Then, the obtained anode 34 was punched in the shape of circle having a diameter of 16 mm. In Examples 1-1 to 1-11, an area density ratio between the cathode 32 and the anode 34 was designed so that a capacity of the anode 34 was expressed by a capacity component by insertion and extraction of lithium.

Further, water was added to a solvent wherein ethylene carbonate and diethyl carbonate were mixed at a mass ratio of 1:1 and an electrolyte salt was dissolved in the solvent to prepare an electrolytic solution. As an electrolyte salt, only the first electrolyte salt, $Li[B(CF_3)_4]$ was used in Examples 1-1, 1-2, 1-4, 1-6, 1-7, and 1-9. The first electrolyte salt, $Li[B(CF_3)_4]$ and the second electrolyte salt, $LiPF_6$ were used in Examples 1-3, 1-5, 1-8, 1-10, and 1-11. Contents of $Li[B(CF_3)_4]$ and $LiPF_6$ in the electrolytic solution were changed as shown in Tables 1 to 4. Regarding the electrolytic solution, micro chemical analysis was conducted by Karl Fischer's method. The obtained moisture contents at a mass ratio in relation to the electrolytic solution are as shown in Tables 1 to 4.

TABLE 1

| | Thickness of anode current collector (μm) | Anode active material layer Material | Anode active material layer Forming method | First electrolyte salt Kind | First electrolyte salt Contents (mol/dm³) | Second electrolyte salt Kind | Second electrolyte salt Contents (mol/dm³) | Moisture content in electrolyte (ppm) | Initial capacity (mAh) | High temperature storage characteristics (%) |
|---|---|---|---|---|---|---|---|---|---|---|
| Example 1-1 | 15 | Artificial graphite | Coating | $Li[B(CF_3)_4]$ | 1.0 | — | 0 | 25 | 3.0 | 75 |
| Example 1-2 | 10 | Artificial graphite | Coating | $Li[B(CF_3)_4]$ | 1.0 | — | 0 | 126 | 3.0 | 69 |
| Example 1-3 | 15 | Artificial graphite | Coating | $Li[B(CF_3)_4]$ | 0.2 | $LiPF_6$ | 0.8 | 24 | 3.03 | 88 |
| Comparative example 1-1 | 15 | Artificial graphite | Coating | — | 0 | $LiPF_6$ | 1.0 | 27 | 3.0 | 60 |
| Comparative example 1-2 | 10 | Artificial graphite | Coating | — | 0 | $LiPF_6$ | 1.0 | 115 | 3.0 | 58 |

TABLE 2

| | Thickness of anode current collector (μm) | Anode active material layer Material | Anode active material layer Forming method | First electrolyte salt Kind | First electrolyte salt Contents (mol/dm³) | Second electrolyte salt Kind | Second electrolyte salt Contents (mol/dm³) | Moisture content in electrolyte (ppm) | Initial capacity (mAh) | High temperature storage characteristics (%) |
|---|---|---|---|---|---|---|---|---|---|---|
| Example 1-4 | 15 | CuSN alloy | Coating | $Li[B(CF_3)_4]$ | 1.0 | — | 0 | 25 | 3.2 | 85 |
| Example 1-5 | 15 | CuSN alloy | Coating | $Li[B(CF_3)_4]$ | 0.2 | $LiPF_6$ | 0.8 | 28 | 3.25 | 86 |
| Comparative example 1-3 | 15 | CuSn alloy | Coating | — | 0 | $LiPF_6$ | 1.0 | 27 | 3.2 | 55 |

TABLE 3

| | Thickness of anode current collector (μm) | Anode active material layer Material | Anode active material layer Forming method | First electrolyte salt Kind | First electrolyte salt Contents (mol/dm³) | Second electrolyte salt Kind | Second electrolyte salt Contents (mol/dm³) | Moisture content in electrolyte (ppm) | Initial capacity (mAh) | High temperature storage characteristics (%) |
|---|---|---|---|---|---|---|---|---|---|---|
| Example 1-6 | 15 | Si | Coating | $Li[B(CF_3)_4]$ | 1.0 | — | 0 | 25 | 3.4 | 88 |
| Example 1-7 | 15 | Si | Coating | $Li[B(CF_3)_4]$ | 1.0 | — | 0 | 60 | 3.4 | 82 |
| Example 1-8 | 15 | Si | Coating | $Li[B(CF_3)_4]$ | 0.2 | $LiPF_6$ | 0.8 | 27 | 3.46 | 87 |
| Comparative example 1-4 | 15 | Si | Coating | — | 0 | $LiPF_6$ | 1.0 | 27 | 3.4 | 60 |

TABLE 4

| | Thickness of anode current collector (μm) | Anode active material layer Material | Anode active material layer Forming method | First electrolyte salt Kind | First electrolyte salt Contents (mol/dm³) | Second electrolyte salt Kind | Second electrolyte salt Contents (mol/dm³) | Moisture content in electrolyte (ppm) | Initial capacity (mAh) | High temperature storage characteristics (%) |
|---|---|---|---|---|---|---|---|---|---|---|
| Example 1-9 | 15 | Si | Deposition | Li[B(CF$_3$)$_4$] | 1.0 | — | 0 | 31 | 3.4 | 89 |
| Example 1-10 | 15 | Si | Deposition | Li[B(CF$_3$)$_4$] | 0.5 | LiPF$_6$ | 0.5 | 25 | 3.5 | 88 |
| Example 1-11 | 15 | Si | Deposition | Li[B(CF$_3$)$_4$] | 0.1 | LiPF$_6$ | 0.9 | 30 | 3.5 | 86 |
| Comparative example 1-5 | 15 | Si | Deposition | — | 0 | LiPF$_6$ | 1.0 | 27 | 3.4 | 45 |

After that, the fabricated cathode 32 and the anode 34 were placed on the exterior can 31 sandwiching the separator 35 made of a micro-porous polyethylene film. An electrolytic solution was injected over the cathode 32 and the anode 34. It was hermetically closed by overlaying the exterior cup 33 and caulking. The secondary batteries of Examples 1-1 to 1-11 were thereby obtained.

As Comparative examples 1-1 to 1-5 in relation to these Examples, secondary batteries were fabricated in a manner similar to in Examples 1-1, 1-2, 1-4, 1-6, and 1-9, respectively, except that only LiPF$_6$ was used as an electrolyte salt. Comparative example 1-1 corresponds to Examples 1-1 and 1-3. Comparative example 1-2 corresponds to Example 1-2. Comparative example 1-3 corresponds to Examples 1-4 and 1-5. Comparative example 1-4 corresponds to Examples 1-6 to 1-8. Comparative example 1-5 corresponds to Examples 1-9 to 1-11. Regarding the electrolytic solution of Comparative examples 1-1 to 1-5, micro chemical analysis was conducted by Karl Fischer's method. The obtained moisture contents at a mass ratio in relation to the electrolytic solution were as shown in Tables 1 to 4.

Regarding the fabricated secondary batteries of Examples 1-1 to 1-11 and Comparative examples 1-1 to 1-5, high temperature storage characteristics were evaluated as follows. In the environment of 23° C., 9 cycles of constant current and constant voltage charge and constant current discharge were conducted. After that, constant current and constant voltage charge was conducted again. The secondary battery was stored for 3 days in the environment of 60° C. After that, constant current discharge was conducted again. Then, a ratio (%) of a discharge capacity after storage in relation to the discharge capacity at 9th cycle before storage was obtained. In this regard, the constant current and constant voltage charge was conducted under conditions that a current density was 1 mA/cm$^2$ and an upper limit voltage was 4.2 V. The constant current discharge was conducted under conditions that a current density was 1 mA/cm$^2$ and a final voltage was 3 V. Obtained results are shown in Tables 1 to 4. An initial capacity in Tables 1 to 4 means a discharge capacity at 1st cycle before storage.

As evidenced by Tables 1 to 4, according to Examples 1-1 to 1-11, wherein Li[B(CF$_3$)$_4$] was used, high temperature storage characteristics could be improved compared to Comparative examples 1-1 to 1-5. That is, it was found that when the electrolytic solution contained the first anions expressed by [B(RF1) (RF2) (RF3) RF4]$^-$, high temperature storage characteristics could be improved.

In Comparative examples 1-1 and 1-2, wherein LiPF$_6$ was used, regarding high temperature storage characteristics, there was little difference between Comparative example 1-1 whose moisture content was 27 ppm and Comparative example 1-2 whose moisture content was 115 ppm. Meanwhile, in Examples 1-1 and 1-2, wherein Li[B(CF$_3$)$_4$] was used, high temperature storage characteristics could be improved in Example 1-1 whose moisture content was 25 ppm than in Example 1-2 whose moisture content was 126 ppm. That is, it was found that when the first anions were contained, a moisture content in the electrolytic solution was preferably small in order to further improve high temperature storage characteristics.

According to Examples 1-3, 1-5, 1-8, 1-10, and 1-11, wherein a mixture of Li[B(CF$_3$)$_4$] and LiPF$_6$ was used, an initial capacity could be improved compared to Examples 1-1, 1-2, 1-4, 1-6, 1-7, and 1-9, wherein only Li[B(CF$_3$)$_4$] was used. That is, it was found that when the second anions were contained in addition to the first anions, a capacity could be improved.

Examples 2-1 to 2-27

Batteries, wherein an anode capacity includes a capacity component by insertion and extraction of lithium and a capacity component by precipitation and dissolution of lithium, and the anode capacity is expressed by the sum of the two capacity components were fabricated. In these Examples, secondary batteries in the shape of a cylinder shown in FIG. 1 were fabricated.

First, the cathode 21 and the anode 22 were formed as in Example 1-1. That is, cobalt acid lithium was used as a cathode active material for the cathode 21, and artificial graphite was used as an anode active material for the anode 22. However, an area density ratio between the cathode 21 and the anode 22 was designed so that a capacity of the anode 22 includes a capacity component by insertion and extraction of lithium and a capacity component by precipitation and dissolution of lithium, and the capacity of the anode 22 is expressed by the sum of the two capacity components.

After the cathode 21 and the anode 22 were respectively formed, the separator 23 made of a micro-porous polypropylene film having a thickness of 25 μm was prepared. Then, the anode 22, the separator 23, the cathode 21, and the separator 23 were layered in this order. This layered body was wound several times vorticosely. The battery device 20 was thereby fabricated.

An electrolytic solution was prepared by dissolving the first electrolyte salt, or the first electrolyte salt and the second electrolyte salt in a solvent wherein propylene carbonate and dimethyl carbonate were mixed at a volume ratio of 1:1. In this regard, in Examples 2-1 to 2-27, kinds and contents in the electrolytic solution of the first electrolyte salt and the second electrolyte salt were changed as shown in Tables 5 and 6.

TABLE 5

| | First electrolyte salt | | Second electrolyte salt | | Initial capacity (mAh) | High temperature storage characteristics (%) |
|---|---|---|---|---|---|---|
| | Kind | Contents (mol/kg) | Kind | Contents (mol/kg) | | |
| Example 2-1 | Li[B(CF$_3$)$_4$] | 1.0 | — | 0 | 1050 | 75.2 |
| Example 2-2 | Li[B(CF$_3$)$_4$] | 0.9 | LiPF$_6$ | 0.1 | 1052 | 77.4 |
| Example 2-3 | Li[B(CF$_3$)$_4$] | 0.8 | LiPF$_6$ | 0.2 | 1054 | 78.2 |
| Example 2-4 | Li[B(CF$_3$)$_4$] | 0.5 | LiPF$_6$ | 0.5 | 1058 | 78.5 |
| Example 2-5 | Li[B(CF$_3$)$_4$] | 0.2 | LiPF$_6$ | 0.8 | 1060 | 78.5 |
| Example 2-6 | Li[B(CF$_3$)$_4$] | 0.1 | LiPF$_6$ | 0.9 | 1056 | 76.5 |
| Example 2-7 | Li[B(CF$_3$)$_4$] | 0.05 | LiPF$_6$ | 0.95 | 1055 | 76.0 |
| Example 2-8 | Li[B(CF$_3$)$_4$] | 0.01 | LiPF$_6$ | 0.99 | 1052 | 74.4 |
| Example 2-9 | Li[B(CF$_3$)$_4$] | 1.0 | LiPF$_6$ | 0.2 | 1054 | 74.5 |
| Example 2-10 | Li[B(CF$_3$)$_4$] | 1.5 | LiPF$_6$ | 0.2 | 1053 | 73.8 |
| Example 2-11 | Li[B(CF$_3$)$_4$] | 2.0 | LiPF$_6$ | 0.2 | 1050 | 72.5 |
| Example 2-12 | Li[B(CF$_3$)$_4$] | 0.8 | LiBF$_4$ | 0.2 | 1051 | 72.7 |
| Example 2-13 | Li[B(CF$_3$)$_4$] | 0.8 | LiClO$_4$ | 0.2 | 1054 | 73.2 |
| Example 2-14 | Li[B(CF$_3$)$_4$] | 0.8 | LiAsF$_6$ | 0.2 | 1055 | 73.8 |
| Example 2-15 | Li[B(CF$_3$)$_4$] | 0.8 | LiN(CF$_3$SO$_2$)$_2$ | 0.2 | 1056 | 73.8 |
| Example 2-16 | Li[B(CF$_3$)$_4$] | 0.8 | LiC(CF$_3$SO$_2$)$_3$ | 0.2 | 1056 | 74.2 |
| Example 2-17 | Li[B(CF$_3$)$_4$] | 0.8 | LiPF$_6$<br>LiBF$_4$ | 0.1<br>0.1 | 1055 | 74.8 |
| Example 2-18 | Li[B(CF$_3$)$_4$] | 0.8 | LiPF$_6$<br>LiClO$_4$ | 0.1<br>0.1 | 1055 | 74.0 |
| Example 2-19 | Li[B(CF$_3$)$_4$] | 0.8 | LiPF$_6$<br>LiAsF$_6$ | 0.1<br>0.1 | 1056 | 75.0 |
| Example 2-20 | Li[B(CF$_3$)$_4$] | 0.8 | LiPF$_6$<br>LiN(CF$_3$SO$_2$)$_2$ | 0.1<br>0.1 | 1058 | 75.3 |
| Example 2-21 | Li[B(CF$_3$)$_4$] | 0.8 | LiPF$_6$<br>LiC(CF$_3$SO$_2$)$_3$ | 0.1<br>0.1 | 1058 | 75.3 |
| Comparative example 2-1 | — | 0 | LiPF$_6$ | 1.0 | 1050 | 72.0 |

TABLE 6

| | First electrolyte salt | | Second electrolyte salt | | Initial capacity (mAh) | High temperature storage characteristics (%) |
|---|---|---|---|---|---|---|
| | Kind | Contents (mol/kg) | Kind | Contents (mol/kg) | | |
| Example 2-1 | Li[B(CF$_3$)$_4$] | 1.0 | — | 0 | 1050 | 75.2 |
| Example 2-3 | Li[B(CF$_3$)$_4$] | 0.8 | LiPF$_6$ | 0.02 | 1054 | 78.2 |
| Example 2-22 | Li[BF$_2$(CF$_3$)$_2$] | 1.0 | — | 0 | 1053 | 75.0 |
| Example 2-23 | Li[BF$_2$(CF$_3$)$_2$] | 0.8 | LiPF$_6$ | 0.2 | 1058 | 75.2 |
| Example 2-24 | Li[BF(CF$_3$)$_3$] | 0.8 | LiPF$_6$ | 0.2 | 1056 | 75.4 |
| Example 2-25 | Li[BF$_3$(CF$_3$)] | 0.8 | LiPF$_6$ | 0.2 | 1055 | 75.5 |
| Example 2-26 | Li[B(C$_2$F$_5$)$_4$] | 0.8 | LiPF$_6$ | 0.2 | 1055 | 75.3 |
| Example 2-27 | Li[B(C$_3$F$_7$)$_4$] | 0.8 | LiPF$_6$ | 0.2 | 1053 | 75.3 |
| Comparative example 2-1 | — | 0 | LiPF$_6$ | 1.0 | 1050 | 72.0 |

Next, the battery device 20 was sandwiched between the insulating plates 12 and 13. The anode terminal 26 was welded to the battery can 11, and the cathode terminal 25 was welded to the safety valve mechanism 15. Then, the battery device 20 was housed inside the battery can 11 made of nickel-plated iron. After that, a prepared electrolytic solution was injected into the battery can 11. The secondary batteries of Examples 2-1 to 2-27 were thereby obtained.

As Comparative example 2-1 in relation to these Examples, a secondary battery was fabricated in a manner similar to in these Examples, except that only LiPF$_6$ was used as an electrolyte salt, and its content was 1.0 mol/kg.

Regarding the secondary batteries of Examples 2-1 to 2-27 and Comparative example 2-1, respective initial capacities and high temperature storage characteristics were examined. Charge was conducted at a constant current of 600 mA until a battery voltage reached 4.2 V, and then conducted at a constant voltage of 4.2 V until a current reached 1 mA. Discharge was conducted at a constant current of 400 mA until a battery voltage reached 3.0 V. An initial capacity is the discharge capacity at 1st cycle obtained as above. After measuring the initial capacity, the battery was fully charged again, and stored for 1 week in a constant temperature bath at 60° C. After that, constant current discharge at 400 mA was conducted until a final voltage reached 3.0 V, and a discharge capacity was obtained. Then, a capacity retention ratio after storage where the initial capacity was 100 was considered as high temperature storage characteristics. Obtained results are shown in Tables 5 and 6.

The secondary batteries of Examples 2-1 to 2-27 and Comparative example 2-1, which were charged and discharged 1 cycle under the foregoing conditions, and fully charged again, were decomposed. These batteries were examined whether lithium metal was deposited on the anode active material layer 22B or not by visual inspection and $^7$Li nuclear magnetic resonance method. Further, these batteries were charged and discharged 2 cycles under the foregoing conditions, fully discharged, and decomposed. Then, the batteries were examined whether lithium metal was deposited on the anode active material layer 22B or not in a similar manner as above.

In result, in the secondary batteries of Examples 2-1 to 2-27 and Comparative example 2-1, lithium metal existed on the anode active material layer 22B in a state of full charge. Lithium metal did not exist in a state of full discharge. That is, it was found that a capacity of the anode 22 included a capacity component by precipitation and dissolution of lithium metal, and a capacity component by insertion and extraction of lithium, and was expressed by the sum of the two capacity components.

As evidenced by Tables 5 and 6, according to Examples 2-1 to 2-27, wherein the first electrolyte salt was used, the initial capacities could be equal to or more than that in Comparative example 2-1, wherein the first electrolyte salt was not used, and high temperature storage characteristics could be improved.

That is, it was found that in the battery whose capacity of the anode 22 included a capacity component by insertion and extraction of lithium and a capacity component by precipitation and dissolution of lithium, and whose capacity of the anode 22 was expressed as the sum of the two capacity components, when the first anions expressed by [B(RF1) (RF2) (RF3) RF4]$^-$ was contained, a large capacity could be obtained, and high temperature storage characteristics could be improved. Further, it could be confirmed that when a content of the first electrolyte salt or the first anions was from 0.01 mol/kg to 2.0 mol/kg, characteristics could be improved.

As evidenced by comparison between Example 2-1 and Examples 2-3, 2-12 to 2-21, according to Examples 2-3, 2-12 to 2-21, wherein a mixture of the first electrolyte salt and the second electrolyte salt was used, the initial capacities could be improved compared to Example 2-1, wherein only the first electrolyte salt was used. Specially, in Example 2-3, wherein LiPF$_6$ was used as a second electrolyte salt, high temperature storage characteristics could be also improved drastically compared to in Example 2-1.

That is, it was found that when the other second anions were used in addition to the first anions, a capacity could be further improved. In particular, it was found that when PF$_6^-$ was used as a second anions, high temperature storage characteristics could be also improved drastically.

Examples 3-1 to 3-5

Lithium ion secondary batteries comprising a gelatinous electrolyte formed by applying a coating solution wherein a high molecular weight compound was dissolved in a mixed solvent on the cathode or the anode were fabricated. In these Examples, the secondary battery shown in FIGS. 4 and 5 was fabricated.

First, the cathode 51 and the anode 52 were formed as in Example 1-1. That is, cobalt acid lithium was used as a cathode active material for the cathode 51, and artificial graphite was used as an anode active material for the anode 52. An area density ratio between the cathode 51 and the anode 52 was designed so that a capacity of the anode 52 was expressed by a capacity component by insertion and extraction of lithium.

A copolymer of vinylidene fluoride and hexafluoro propylene as a high molecular weight compound was added at 5 wt % in relation to a solution, wherein 14.4 parts by mass of propylene carbonate, 14.4 parts by mass of ethylene carbonate, an electrolyte salt, and 60 parts by mass of dimethyl carbonate of a mixed solvent were mixed. The resultant was heated, stirred, and swollen to prepare a coating solution. In this regard, as an electrolyte salt, only the first electrolyte salt, Li[B(CF$_3$)$_4$] was used in Example 3-1, and the first electrolyte salt, Li[B(CF$_3$)$_4$] and the second electrolyte salt were used in Examples 3-2 to 3-5. Contents of the first electrolyte salt in the electrolytic solution, and kinds and contents of the second electrolyte salt in the electrolytic solution were changed in Examples 3-1 to 3-5 shown in Table 7. A ratio between vinylidene fluoride and hexafluoro propylene in the copolymer was 93:7 at a mass ratio.

TABLE 7

| | First electrolyte salt | | Second electrolyte salt | | Initial capacity (mAh) | High temperature storage characteristics (%) |
|---|---|---|---|---|---|---|
| | Kind | Contents (mol/dm$^3$) | Kind | Contents (mol/dm$^3$) | | |
| Example 3-1 | Li[B(CF$_3$)$_4$] | 1.0 | — | 0 | 452 | 72 |
| Example 3-2 | Li[B(CF$_3$)$_4$] | 0.5 | LiPF$_6$ | 0.5 | 456 | 76 |
| Example 3-3 | Li[B(CF$_3$)$_4$] | 0.1 | LiPF$_6$ | 0.9 | 458 | 78 |
| Example 3-4 | Li[B(CF$_3$)$_4$] | 0.1 | LiPF$_6$ | 0.8 | 457 | −78 |
| | | | LiBF$_4$ | 0.1 | | |
| Example 3-5 | Li[B(CF$_3$)$_4$] | 0.1 | LiPF$_6$ | 0.8 | 457 | 74 |
| | | | LiN(CF$_3$SO$_2$)$_2$ | 0.1 | | |
| Comparative example 3-1 | — | 0 | LiPF$_6$ | 1.0 | 451 | 65 |

Next, after the coating solution was applied on the cathode 51 and the anode 52, dimethyl carbonate was volatilized to form a gelatinous electrolyte. After that, the cathode 51 and the anode 52 on which the gelatinous electrolyte was formed were layered sandwiching the separator 53 made of a microporous polyethylene film, and were wound several times. The protective tape 54 was adhered to the outermost periphery part to form the battery device 50. Subsequently, while the cathode terminal 41 and the anode terminal 42 were derived outside, the battery device 50 was enclosed inside the exterior members 60A and 60B made of laminated films under lowered pressure. The secondary batteries of Examples 3-1 to 3-5 were thereby obtained.

As Comparative example 3-1 in relation to these Examples, a secondary battery was fabricated in a manner similar to in these Examples, except that only LiPF$_6$ was used as an electrolytic salt, and the content of LiPF$_6$ was 1.0 mol/dm$^3$.

Regarding the fabricated secondary batteries of Examples 3-1 to 3-5 and Comparative example 3-1, high temperature storage characteristics were examined. First, constant current and constant voltage charge of 100 mA at 25° C. was conducted for 15 hours until an upper limit of 4.2 V. Then, constant current discharge of 100 mA was conducted until a final voltage of 2.5 V. Subsequently, constant current and constant voltage charge of 100 mA at 25° C. was conducted for 2 hours until the upper limit of 4.2 V, then constant current discharge of 500 mA was conducted 50 cycles until the final voltage of 2.5 V. The discharge capacity at first cycle was set to an initial capacity, and the discharge capacity at 50th cycle was set to a standard capacity. After that, constant current and constant voltage charge of 1,000 mA at 25° C. was conducted for 2 hours until the upper limit of 4.2 V. The charged batteries were stored in a constant temperature bath at 80° C. for 2 days. Then, constant current discharge of 500 mA was conducted until the final voltage of 2.5 V, and a discharge capacity after storage was obtained. A capacity retention ratio after storage was set to high temperature storage characteristics, where the standard capacity was 100%. Obtained results are shown in Table 7.

As evidenced by Table 7, according to Examples 3-1 to 3-5, wherein Li[B(CF$_3$)$_4$] was used, high temperature storage characteristics could be improved compared to Comparative example 3-1, wherein Li[B(CF$_3$)$_4$] was not used. That is, it was found that in the secondary battery comprising the gelatinous electrolyte formed by applying the coating solution wherein the high molecular weight compound was dissolved in the mixed solvent on the cathode 21 and the anode 22, high temperature storage characteristics could be improved when the first anions expressed by [B(RF1)(RF2)(RF3)RF4]$^-$ was contained.

Further, as evidenced by comparison among Examples 3-1 to 3-5, according to Examples 3-2 to 3-5, wherein the mixture of the first electrolyte salt and the second electrolyte salt was used, initial capacities could be improved compared to Example 3-1, wherein only the first electrolyte salt was used. That is, it was found that when the second anions was contained in addition to the first anions, capacities could be improved.

Examples 4-1 to 4-6

Figure 6:
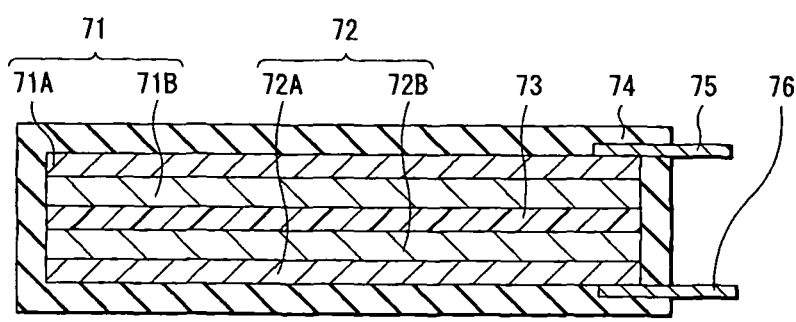
FIG. 6 is a cross sectional view which shows a construction of a secondary battery formed in Examples 4-1 to 4-6 of the invention.

Secondary batteries comprising a gelatinous electrolyte formed by firstly impregnating an electrolyte composition of matter containing a polymer compound and an electrolytic solution into the cathode and the anode, and then polymerizing the polymer compound were fabricated. In these Examples, the secondary battery in the shape of a so-called flat type (or a paper type/a card type) shown in FIG. 6 was fabricated. In this secondary battery, a cathode 71 and an anode 72 were layered sandwiching a separator 73 in which the gelatinous electrolyte was impregnated, and enclosed in an exterior member 74.

First, the cathode 71 and the anode 72 were formed as in Example 1-1. That is, cobalt acid lithium was used as a cathode active material for the cathode 71, and artificial graphite was used as an anode active material for the anode 72. An area density ratio between the cathode 71 and the anode 72 was designed so that a capacity of the anode 72 was expressed by a capacity component by insertion and extraction of lithium.

Further, 5 parts by mass of a polymer compound solution, and 0.1 parts by mass of t-butyl peroxineodecanoate as a polymerization initiator were mixed in relation to the electrolytic solution of 100 parts by mass to form an electrolyte composition of matter. A electrolytic solution in which the first electrolyte salt, Li[B(CF$_3$)$_4$], or the first electrolyte salt, Li[B(CF$_3$)$_4$] and the second electrolyte salt, LiPF$_6$ were dissolved as an electrolyte salt into a solvent wherein ethylene carbonate and diethyl carbonate were mixed at a mass ratio of 3:7 was used. Contents of the first electrolyte salt and the second electrolyte salt in the electrolytic solution were changed in Examples 4-1 to 4-6 as shown in Tables 8 and 9. As a polymer compound, a compound having 3 structural parts shown in Chemical formula 19 at a molar ratio of a:b:c=30:40:30 was used in Examples 4-1 to 4-3, and a compound having 3 structural parts shown in Chemical formula 20 at a molar ratio of a:b:c=50:30:20 was used in Examples 4-4 to 4-6.

TABLE 8

| | Polymer compound | First electrolyte salt Kind | Contents (mol/dm$^3$) | Second electrolyte salt Kind | Contents (mol/dm$^3$) | Initial capacity (mAh) | High temperature storage characteristics (%) |
|---|---|---|---|---|---|---|---|
| Example 4-1 | Chemical formula 19 | Li[B(CF$_3$)$_4$] | 1.0 | — | 0 | 20 | 77 |
| Example 4-2 | Chemical formula 19 | Li[B(CF$_3$)$_4$] | 0.5 | LiPF$_6$ | 0.5 | 22 | 79 |
| Example 4-3 | Chemical formula 19 | Li[B(CF$_3$)$_4$] | 0.1 | LiPF$_6$ | 0.9 | 22 | 79 |
| Comparative example 4-1 | Chemical formula 19 | — | 0 | LiPF$_6$ | 1.0 | 20 | 63 |

TABLE 9

| | Polymer compound | First electrolyte salt Kind | Contents (mol/dm$^3$) | Second electrolyte salt Kind | Contents (mol/dm$^3$) | Initial capacity (mAh) | High temperature storage characteristics (%) |
|---|---|---|---|---|---|---|---|
| Example 4-4 | Chemical formula 20 | Li[B(CF$_3$)$_4$] | 1.0 | — | 0 | 19 | 73 |
| Example 4-5 | Chemical formula 20 | Li[B(CF$_3$)$_4$] | 0.5 | LiPF$_6$ | 0.5 | 21 | 76 |

TABLE 9-continued

| | Polymer compound | First electrolyte salt Kind | First electrolyte salt Contents (mol/dm$^3$) | Second electrolyte salt Kind | Second electrolyte salt Contents (mol/dm$^3$) | Initial capacity (mAh) | High temperature storage characteristics (%) |
|---|---|---|---|---|---|---|---|
| Example 4-6 | Chemical formula 20 | Li[B(CF$_3$)$_4$] | 0.1 | LiPF$_6$ | 0.9 | 21 | 77 |
| Comparative example 4-2 | Chemical formula 20 | — | 0 | LiPF$_6$ | 1.0 | 19 | 64 |

[Chemical formula 19]

(a)
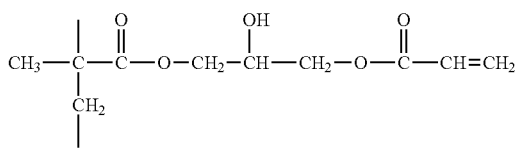

(b)
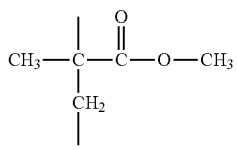

(c)
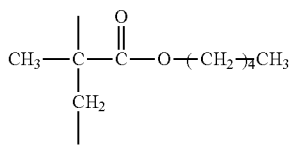

[Chemical formula 20]

(a)
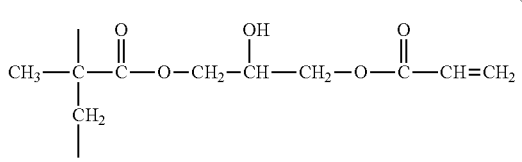

(b)
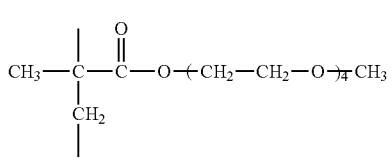

(c)
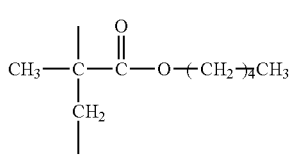

Next, after the electrolyte composition of matter was impregnated in the formed cathode 71 and the anode 72, the cathode 71 and the anode 72 were contacted sandwiching the separator 73 made of a micro-porous polyethylene film having a thickness of 25 μm, and enclosed inside the exterior member 74 under lowered pressure. As the exterior member 74, a wetproof aluminum laminated film wherein a nylon film having a thickness of 25 μm, an aluminum foil having a thickness of 40 μm, and a polypropylene film having a thickness of 30 μm were layered in this order from the outermost layer was used. After that, the resultant was sandwiched between glass plates, heated for 30 minutes at 75° C. A gelatinous electrolyte was formed by gelatinizing the electrolyte composition of matter by polymerizing the polymer compound. The secondary batteries of Examples 4-1 to 4-6 were thereby obtained.

As Comparative examples 4-1 and 4-2 in relation to these Examples, secondary batteries were fabricated in a manner similar to in Examples 4-1 and 4-4, except that only LiPF$_6$ was used as an electrolyte salt, and the content of LiPF$_6$ was 0.1 mol/dm$^3$. Comparative example 4-1 corresponded to Examples 4-1 to 4-3, and Comparative example 4-2 corresponded to Examples 4-4 to 4-6.

Regarding the fabricated secondary batteries of Examples 4-1 to 4-6 and Comparative examples 4-1 and 4-2, high temperature storage characteristics were examined as in Example 3-1. Obtained results are shown in Tables 8 and 9.

As evidenced by Tables 8 and 9, according to Examples 4-1 to 4-6, wherein Li[B(CF$_3$)$_4$] was used, high temperature storage characteristics could be improved compared to Comparative examples 4-1 and 4-2 wherein Li[B(CF$_3$)$_4$] was not used. That is, it was found that in the secondary battery comprising the gelatinous electrolyte formed by impregnating the electrolyte composition of matter wherein the polymer compound and the electrolytic solution were contained in the cathode 71 and the anode 72, and then polymerizing the polymer compound, high temperature storage characteristics could be improved when the first anions expressed by [B(RF1) (RF2) (RF3) RF4]$^-$ was contained.

Further, as evidenced by comparison between Examples 4-1 to 4-3 and Examples 4-4 to 4-6, according to Examples 4-2, 4-3, 4-5, and 4-6, wherein the mixture of the first electrolyte salt and the second electrolyte salt was used, initial capacities could be improved compared to Examples 4-1 and 4-4, wherein only the first electrolyte salt was used. That is, it was found that when the second anions were contained in addition to the first anions, capacities could be improved.

Further, as evidenced by comparison between Table 8 and Table 9, a high temperature storage characteristics difference between Examples 4-1 to 4-3 and Comparative example 4-1, using the high molecular weight compound having a structure wherein the polymer compound not including an ether group was polymerized was larger than a high temperature storage characteristics difference between Examples 4-4 to 4-6 and Comparative example 4-2, using the high molecular weight compound-having a structure wherein the polymer compound including an ether group was polymerized. That is, it was found that higher effects could be obtained when the high molecular weight compound having a structure wherein the polymer compound not including an ether group was polymerized was used.

In the foregoing Examples, descriptions have been given by citing concrete examples of the first electrolyte salt. The foregoing effects appear to be caused by the structure of the first electrolyte salt. Therefore, the similar results can be obtained when other first electrolyte salt expressed by Chemical formula 2 or other first anions are contained.

While the invention has been described with reference to the embodiments and Examples, the invention is not limited to the foregoing embodiments and Examples, and various modifications may be made. For example, in the foregoing embodiments and Examples, descriptions have been given of the case using lithium as a light metal of an electrode reaction material. However, the invention can be applied to the case using other elements in Group 1 in the long-period periodic table such as sodium (Na) and potassium (Ka), the case using other elements in Group 2 in the long-period periodic table such as magnesium and calcium (Ca), the case using other light metal such as aluminum, and the case using alloys of lithium or the foregoing light metals. In these cases, similar effects can be also obtained. In this regard, an anode material capable of inserting and extracting light metals, a cathode material, a nonaqueous solvent and the like are selected corresponding to the light metal to be used.

In the foregoing embodiments and Examples, descriptions have been given of the case using the electrolytic solution, or the gelatinous electrolyte, which is one of the solid electrolytes. However, other electrolyte can be used. Examples of other electrolytes include a high polymer solid electrolyte wherein an electrolyte salt was dispersed in a high molecular weight compound having ion conductivity; an ion conductive inorganic compound consisted of ion conductive ceramics, ion conductive glasses or ionic crystals; a mixture of the ion conductive inorganic compound and an electrolytic solution; and a mixture of the ion conductive inorganic compound and the gelatinous electrolyte or the high polymer solid electrolyte. As a high molecular weight compound of the high polymer solid electrolyte, an ether high molecular weight compound such as polyethylene oxide and a cross-linked body including polyethylene oxide, an ester high molecular weight compound such as polymethacrylate, or an acrylate high molecular weight compound can be used by itself, by mixing, or by copolymerization. As an inorganic solid electrolyte, lithium nitride, lithium phosphate or the like can be used.

Further, in the foregoing embodiments and Examples, constructions of the secondary batteries have been explained by using examples. However, the invention can be applied to batteries having other constructions. For example, in the foregoing embodiments and Examples, descriptions have been given of the secondary batteries in the shape of a cylinder type, a winding laminated type, a coin type, and a monolayer laminated type. However, the invention can be applied to the secondary batteries in the shape of a layered laminated type, in addition, a square type and a button type. Further, the invention can be applied to primary batteries instead of the secondary batteries.

Obviously many modifications and variations of the present invention are possible in the light of the above teachings. It is therefore to be understood that within the scope of the appended claims the invention may be practiced otherwise than as specifically described.

What is claimed is:

1. A battery comprising:
   a cathode;
   an anode;
   a separator in-between the cathode and the anode; and
   a gelatinous electrolyte impregnated in the separator, wherein,
   the gelatinous electrolyte comprises an anion expressed by the formula [B(RF1)(RF2)(RF3)RF4], where each of RF1, RF2, RF3, and RF4 represents a perfluoro alkyl group, of the general formula $C_nF_{2n+1}$, where $5 \leq n \leq 12$.

2. The battery according to claim 1 further comprising $N(C_4F_9SO_2)(CF_3SO_2)^-$.

3. The battery according to claim 1 wherein the gelatinous electrolyte is polymerized by using a peroxyester polymerization initiator.

4. The battery according to claim 1, wherein the battery is enclosed by an exterior member.

5. The battery according to claim 1 wherein a moisture content in the gelatinous electrolyte is 100 ppm or less at a mass ratio in relation to the gelatinous electrolyte.

6. The battery according to claim 1 wherein the cathode contains an active material capable of inserting and extracting lithium.

7. The battery according to claim 1 wherein the gelatinous electrolyte includes an anion represented by the formula $[N(C_iF_{2i+1}SO_2)(C_jF_{2j+1}SO_2)]^-$, where i is integer number of 4 or more and j in is an integer number of 1 or more.

\* \* \* \* \*